United States Patent
Zhu et al.

(10) Patent No.: US 11,773,954 B1
(45) Date of Patent: Oct. 3, 2023

(54) MULTI-MODE HYDRO-MECHANICAL HYBRID TRANSMISSION DEVICE

(71) Applicant: JIANGSU UNIVERSITY, Zhenjiang (CN)

(72) Inventors: Zhen Zhu, Zhenjiang (CN); Jie Sheng, Zhenjiang (CN); Yingfeng Cai, Zhenjiang (CN); Long Chen, Zhenjiang (CN); Xiaodong Sun, Zhenjiang (CN); Xiang Tian, Zhenjiang (CN); Changgao Xia, Zhenjiang (CN); Yihan Zhang, Zhenjiang (CN); Rui Hou, Zhenjiang (CN)

(73) Assignee: JIANGSU UNIVERSITY, Zhenjiang (CN)

(*) Notice: Subject to any disclaimer, the term of this patent is extended or adjusted under 35 U.S.C. 154(b) by 0 days.

(21) Appl. No.: 18/025,653

(22) PCT Filed: Feb. 24, 2022

(86) PCT No.: PCT/CN2022/077552
§ 371 (c)(1),
(2) Date: Mar. 10, 2023

(30) Foreign Application Priority Data

Feb. 22, 2022 (CN) .......................... 202210163801.4

(51) Int. Cl.
*F16H 47/04* (2006.01)
*F16H 61/70* (2006.01)
(Continued)

(52) U.S. Cl.
CPC ............. *F16H 47/04* (2013.01); *F16H 61/70* (2013.01); *F16H 61/705* (2013.01); *F16H 39/00* (2013.01);
(Continued)

(58) Field of Classification Search
CPC .......... F16H 47/04; F16H 61/70; F16H 61/66; F16H 39/00–42; F16H 2200/2012
See application file for complete search history.

(56) References Cited

U.S. PATENT DOCUMENTS

| 3,503,278 A * | 3/1970 | Livezey | B60K 5/08 475/23 |
| 10,591,038 B2 * | 3/2020 | Cronin | F16H 47/04 |

(Continued)

FOREIGN PATENT DOCUMENTS

| CN | 111946792 A | 11/2020 |
| CN | 111946794 A | 11/2020 |

(Continued)

*Primary Examiner* — Tinh Dang
(74) *Attorney, Agent, or Firm* — Bayramoglu Law Offices LLC

(57) ABSTRACT

A multi-mode hydro-mechanical hybrid transmission device includes an input member, a hydraulic transmission mechanism, a mechanical transmission mechanism, a convergence mechanism, an output member, a clutch assembly, and a brake assembly. The clutch assembly connects an output end of the input member to an input end of the hydraulic transmission mechanism, the mechanical transmission mechanism, and the convergence mechanism. The clutch assembly connects an output end of the hydraulic transmission mechanism to the convergence mechanism. The clutch assembly connects the mechanical transmission mechanism to the convergence mechanism. The convergence mechanism is connected to the output member. Continuously changing transmission ratios are provided between the input member and the output member by adjusting a displacement ratio of the hydraulic transmission mechanism and selectively controlling engagement of the clutch assembly and the brake assembly.

8 Claims, 16 Drawing Sheets

(51) Int. Cl.
*F16H 39/00* (2006.01)
*F16H 61/66* (2006.01)

(52) U.S. Cl.
CPC ...... *F16H 61/66* (2013.01); *F16H 2200/2012* (2013.01); *F16H 2702/02* (2013.01)

(56) References Cited

U.S. PATENT DOCUMENTS

| | | | |
|---|---|---|---|
| 10,851,892 B2 * | 12/2020 | Beyer | F16H 61/472 |
| 10,948,063 B2 * | 3/2021 | Seipold | F16H 37/084 |
| 2017/0166183 A1 | 6/2017 | Cho | |

FOREIGN PATENT DOCUMENTS

| | | |
|---|---|---|
| CN | 113137462 A | 7/2021 |
| CN | 113147378 A | 7/2021 |
| CN | 114001139 A | 2/2022 |

* cited by examiner

MULTI-MODE HYDRO-MECHANICAL HYBRID TRANSMISSION DEVICE

CROSS REFERENCE TO THE RELATED APPLICATIONS

This application is the national phase entry of International Application No. PCT/CN2022/077552, filed on Feb. 24, 2022, which is based upon and claims priority to Chinese Patent Application No. 202210163801.4, filed on Feb. 22, 2022, the entire contents of which are incorporated herein by reference.

TECHNICAL FIELD

The present disclosure relates to the field of gearboxes, and in particular, to a multi-mode hydro-mechanical hybrid transmission device.

BACKGROUND

Multi-functional hydro-mechanical transmission devices generally adopt hydraulic transmission for flexible high-torque startup, mechanical transmission for efficient transfer, and hydro-mechanical hybrid transmission for efficient stepless speed regulation to meet operation requirements of various working conditions within the entire speed regulation range. It is relatively easy to realize stepless speed regulation with forward gears in the common hydro-mechanical hybrid transmission, but fails to fully consider the adaptability of reverse gears to the working conditions. Since the hydro-mechanical hybrid transmission achieves efficient stepless speed variation within the forward and reverse speed regulation ranges, a hydro-mechanical transmission mode based on reasonable shifting among multiple gears can be used to solve the above problem.

SUMMARY

To eliminate the defects in the prior art, the present disclosure provides a multi-mode hydro-mechanical hybrid transmission device capable of switching among modes such as mechanical transmission, hydraulic transmission, and hydro-mechanical hybrid transmission through combination and engagement/disengagement of clutches and brakes, which improves the fault tolerance of the system, increases the degree of freedom in adjustment, and expands the forward and reverse speed regulation ranges.

The present disclosure achieves the above objective through the following technical solution.

A multi-mode hydro-mechanical hybrid transmission device includes an input member, a hydraulic transmission mechanism, a mechanical transmission mechanism, a convergence mechanism, an output member, a clutch assembly, and a brake assembly, where the clutch assembly connects an output end of the input member to an input end of the hydraulic transmission mechanism, the mechanical transmission mechanism, and the convergence mechanism, the clutch assembly connects an output end of the hydraulic transmission mechanism to the convergence mechanism, and the clutch assembly connects the mechanical transmission mechanism to the convergence mechanism; the convergence mechanism is connected to the output member; continuously changing transmission ratios are provided between the input member and the output member by adjusting a displacement ratio of the hydraulic transmission mechanism and selectively controlling engagement of the clutch assembly and the brake assembly.

Further, the mechanical transmission mechanism includes a mechanical transmission output shaft, a left planetary gear train, and a right planetary gear train;

the left planetary gear train includes a left sun gear, a left planet carrier, and a left ring gear;

the right planetary gear train includes a right planet carrier, a right sun gear, and a right ring gear, where the left sun gear is connected to the right sun gear and the right ring gear is connected to the left planet carrier;

the clutch assembly includes a fifth clutch $C_5$ and a sixth clutch $C_6$, where the fifth clutch $C_5$ is configured for connecting the right ring gear to the mechanical transmission output shaft and the sixth clutch $C_6$ is configured for connecting the right sun gear to the mechanical transmission output shaft; the brake assembly includes a second brake $B_2$ and a third brake $B_3$, where the second brake $B_2$ is configured for connecting the left ring gear to a fixed member and the third brake $B_3$ is configured for connecting the right ring gear to a fixed member;

Further, the convergence mechanism includes a convergence mechanism left planetary gear train and a convergence mechanism right gear train, where the convergence mechanism left planetary gear train includes a convergence mechanism left planet carrier, a convergence mechanism left sun gear, and a convergence mechanism left ring gear; the convergence mechanism right gear train includes a convergence mechanism right sun gear, a convergence mechanism right planet carrier, and a convergence mechanism right ring gear; the convergence mechanism left sun gear is connected to the convergence mechanism right sun gear, and the convergence mechanism left sun gear is connected to the output end of the hydraulic transmission mechanism; the convergence mechanism left ring gear is connected to the convergence mechanism right planet carrier; the input member is connected to the convergence mechanism left planet carrier through a left gear pair and a right gear pair; the convergence mechanism right ring gear is connected to the mechanical transmission output shaft through a mechanical transmission output gear pair, and the convergence mechanism right planet carrier is connected to the output member;

the clutch assembly further includes a third clutch $C_3$, a fourth clutch $C_4$, and a seventh clutch $C_7$, where the third clutch $C_3$ is configured for connecting the input member to an input end of the convergence mechanism through the left gear pair, the fourth clutch $C_4$ is configured for connecting the input member to the input end of the convergence mechanism through the right gear pair, and the seventh clutch $C_7$ is configured for connecting the convergence mechanism right sun gear to the convergence mechanism right planet carrier; the brake assembly further includes a first brake $B_1$ and a fourth brake $B_4$, where the first brake $B_1$ is configured for connecting the convergence mechanism left sun gear to a fixed member and the fourth brake $B_4$ is configured for connecting the convergence mechanism right ring gear to a fixed member.

Further, forward or reverse transmission modes including hydraulic transmission, mechanical transmission, and hydro-mechanical hybrid transmission are provided between the input member and the output member by adjusting the displacement ratio of the hydraulic transmission mechanism and selectively controlling engagement of the clutch assembly and the brake assembly.

Further, forward or reverse mechanical transmissions of various transmission ratios are provided between the input member and the output member by engaging the third clutch $C_3$, the fourth clutch $C_4$, the fifth clutch $C_5$, the sixth clutch $C_6$, the first brake $B_1$, the second brake $B_2$, and the third brake $B_3$.

Further, forward mechanical transmission F(M1) is provided between the input member and the output member by engaging the fifth clutch $C_5$, the sixth clutch $C_6$, and the first brake $B_1$, and rotation speeds of the input member and the output member in the mechanical transmission F(M1) satisfy the following relationship:

$$n_o = \frac{k_4}{(k_4+1)i_6 i_7} n_I;$$

where $n_o$ is the rotation speed of the output member and $n_I$ is the rotation speed of the input member; $k_4$ is a characteristic parameter of the convergence mechanism right gear train; $i_6 i_7$ is a transmission ratio between the mechanical transmission output shaft and the convergence mechanism right ring gear;

forward mechanical transmission F(M2) is provided between the input member and the output member by engaging the sixth clutch $C_6$, the first brake $B_1$, and the third brake $B_3$, and the rotation speeds of the input member and the output member in the mechanical transmission F(M2) satisfy the following relationship:

$$n_o = \frac{(k_1+1)(k_2+1)k_4}{(k_1+k_2+1)(k_4+1)i_6 i_7} n_I$$

where $k_1$ is a characteristic parameter of the left planetary gear train and $k_2$ is a characteristic parameter of the right planetary gear train;

forward mechanical transmission F(M3) is provided between the input member and the output member by engaging the third clutch $C_3$ and the seventh clutch $C_7$, and the rotation speeds of the input member and the output member in the mechanical transmission F(M3) satisfy the following relationship:

$$n_o = \frac{1}{i_3 i_4} n_I$$

where $i_3 i_4$ is a transmission ratio of the left gear pair;

forward mechanical transmission F(M4) is provided between the input member and the output member by engaging the sixth clutch $C_6$, the first brake $B_1$, and the second brake $B_2$, and the rotation speeds of the input member and the output member in the mechanical transmission F(M4) satisfy the following relationship:

$$n_o = \frac{(k_1+1)k_4}{(k_4+1)i_6 i_7} n_I;$$

reverse mechanical transmission R(M1) is provided between the input member and the output member by engaging the fifth clutch $C_5$, the first brake $B_1$, and the second brake $B_2$, and the rotation speeds of the input member and the output member in the mechanical transmission R(M1) satisfy the following relationship:

$$n_o = -\frac{(k_1+1)}{k_2(k_4+1)i_6 i_7} n_I;$$

reverse mechanical transmission R(M2) is provided between the input member and the output member by engaging the fourth clutch $C_4$ and the first brake $B_1$, and the rotation speeds of the input member and the output member in the mechanical transmission R(M2) satisfy the following relationship:

$$n_o = -\frac{k_3+1}{k_3 i_5} n_I$$

where $k_3$ is a characteristic parameter of the convergence mechanism left gear train and $i_5$ is a transmission ratio of the right gear pair.

Further, the clutch assembly further includes a first clutch $C_1$ and a second clutch $C_2$, where the first clutch $C_1$ is configured for connecting the input member to the input end of the hydraulic transmission mechanism, and the second clutch $C_2$ is configured for connecting the output end of the hydraulic transmission mechanism to the convergence mechanism left sun gear; forward or reverse hydraulic transmissions of various transmission ratios are provided between the input member and the output member by adjusting the displacement ratio of the hydraulic transmission mechanism and engaging the first clutch $C_1$, the second clutch $C_2$, the seventh clutch $C_7$, and the fourth brake $B_4$.

Further, forward or reverse hydraulic transmission F(H1)/R(H1) is provided between the input member and the output member by adjusting the displacement ratio of the hydraulic transmission mechanism and engaging the first clutch $C_1$, the second clutch $C_2$, and the fourth brake $B_4$, and the rotation speeds of the input member and the output member in the hydraulic transmission F(H1)/R(H1) satisfy the following relationship:

$$n_o = \frac{e}{(k_4+1)i_1 i_2} n_I$$

where $k_4$ is the characteristic parameter of the convergence mechanism right gear train; e is the displacement ratio of the hydraulic transmission mechanism; $i_1$ is a transmission ratio between the input end of the hydraulic transmission mechanism and the input member, and $i_2$ is a transmission ratio between the output end of the hydraulic transmission mechanism and the convergence mechanism left sun gear; when e>0, the gear F(H1) is implemented and when e<0, the gear R(H1) is implemented;

forward or reverse hydraulic transmission F(H2)/R(H2) is provided between the input member and the output member by engaging the first clutch $C_1$, the second clutch $C_2$, and the seventh clutch $C_7$, and the rotation speeds of the input member and the output member in the hydraulic transmission F(H2)/R(H2) satisfy the following relationship:

$$n_o = \frac{e}{i_1 i_2} n_I$$

where when e>0, the gear F(H2) is implemented and when e<0, the gear R(H2) is implemented.

Further, forward or reverse hydro-mechanical hybrid transmissions of various transmission ratios are provided between the input member and the output member by adjusting the displacement ratio of the hydraulic transmission mechanism and engaging the first clutch $C_1$, the second clutch $C_2$, the third clutch $C_3$, the fourth clutch $C_4$, the fifth clutch $C_5$, the sixth clutch $C_6$, the second brake $B_2$, and the third brake $B_3$.

Further, forward hydro-mechanical hybrid transmission F(HM1) is provided between the input member and the output member by adjusting the displacement ratio of the hydraulic transmission mechanism and engaging the first clutch $C_1$, the second clutch $C_2$, the fifth clutch $C_5$, and the sixth clutch $C_6$, and the rotation speeds of the input member and the output member in the hydro-mechanical hybrid transmission F(HM1) satisfy the following relationship:

$$n_o = \frac{\frac{e}{i_1 i_2} + \frac{k_4}{i_6 i_7}}{k_4 + 1} n_I;$$

forward hydro-mechanical hybrid transmission F(HM2) is provided between the input member and the output member by adjusting the displacement ratio of the hydraulic transmission mechanism and engaging the first clutch $C_1$, the second clutch $C_2$, and the third clutch $C_3$, and the rotation speeds of the input member and the output member in the hydro-mechanical hybrid transmission F(HM2) satisfy the following relationship:

$$n_o = \frac{\frac{k_3+1}{i_3 i_4} - \frac{e}{i_1 i_2}}{k_3} n_I;$$

forward hydro-mechanical hybrid transmission F(HM3) is provided between the input member and the output member by adjusting the displacement ratio of the hydraulic transmission mechanism and engaging the first clutch $C_1$, the second clutch $C_2$, the sixth clutch $C_6$, and the third brake $B_3$, and the rotation speeds of the input member and the output member in the hydro-mechanical hybrid transmission F(HM3) satisfy the following relationship:

$$n_o = \frac{\frac{(k_1+1)(k_2+1)k_4}{(k_1+k_2+1)i_6 i_7} + \frac{e}{i_1 i_2}}{k_4 + 1} n_I;$$

forward hydro-mechanical hybrid transmission F(HM4) is provided between the input member and the output member by adjusting the displacement ratio of the hydraulic transmission mechanism and engaging the first clutch $C_1$, the second clutch $C_2$, the sixth clutch $C_6$, and the second brake $B_2$, and the rotation speeds of the input member and the output member in the hydro-mechanical hybrid transmission F(HM4) satisfy the following relationship:

$$n_o = \frac{\frac{(k_1+1)k_4}{i_6 i_7} + \frac{e}{i_1 i_2}}{(k_4+1)} n_I;$$

reverse hydro-mechanical hybrid transmission R(HM1) is provided between the input member and the output member by adjusting the displacement ratio of the hydraulic transmission mechanism and engaging the first clutch $C_1$, the second clutch $C_2$, the fifth clutch $C_5$, and the second brake $B_2$, and the rotation speeds of the input member and the output member in the hydro-mechanical hybrid transmission R(HM1) satisfy the following relationship:

$$n_o = \frac{-\frac{(k_1+1)k_4}{k_2 i_6 i_7} + \frac{e}{i_1 i_2}}{k_4 + 1} n_I;$$

reverse hydro-mechanical hybrid transmission R(HM2) is provided between the input member and the output member by adjusting the displacement ratio of the hydraulic transmission mechanism and engaging the first clutch $C_1$, the second clutch $C_2$, and the fourth clutch $C_4$, and the rotation speeds of the input member and the output member in the hydro-mechanical hybrid transmission R(HM2) satisfy the following relationship:

$$n_o = \frac{-\frac{k_3+1}{i_5} - \frac{e}{i_1 i_2}}{k_3} n_I.$$

The present disclosure has the following advantages.

The multi-mode hydro-mechanical hybrid transmission device of the present disclosure adopts 14 gears in the hydraulic transmission, mechanical transmission, and hydro-mechanical hybrid transmission modes to meet the requirements of complex operations, which realizes gear shift without power interruption among the hydraulic transmission gears and the hydro-mechanical transmission gears and also realizes stepless speed regulation among the hydro-mechanical transmission gears, expands the forward and reverse speed regulation ranges, and increases the degree of freedom in adjustment.

BRIEF DESCRIPTION OF THE DRAWINGS

To illustrate the technical solutions in the embodiments of the present disclosure or in the prior art more clearly, the accompanying drawings required for the description of the embodiments or the prior art are introduced briefly in the following. Apparently, the accompanying drawings in the following description show some embodiments of the present disclosure, and persons of ordinary skill in the art can derive other drawings from the accompanying drawings without creative efforts.

In the drawings.

Figure 1:
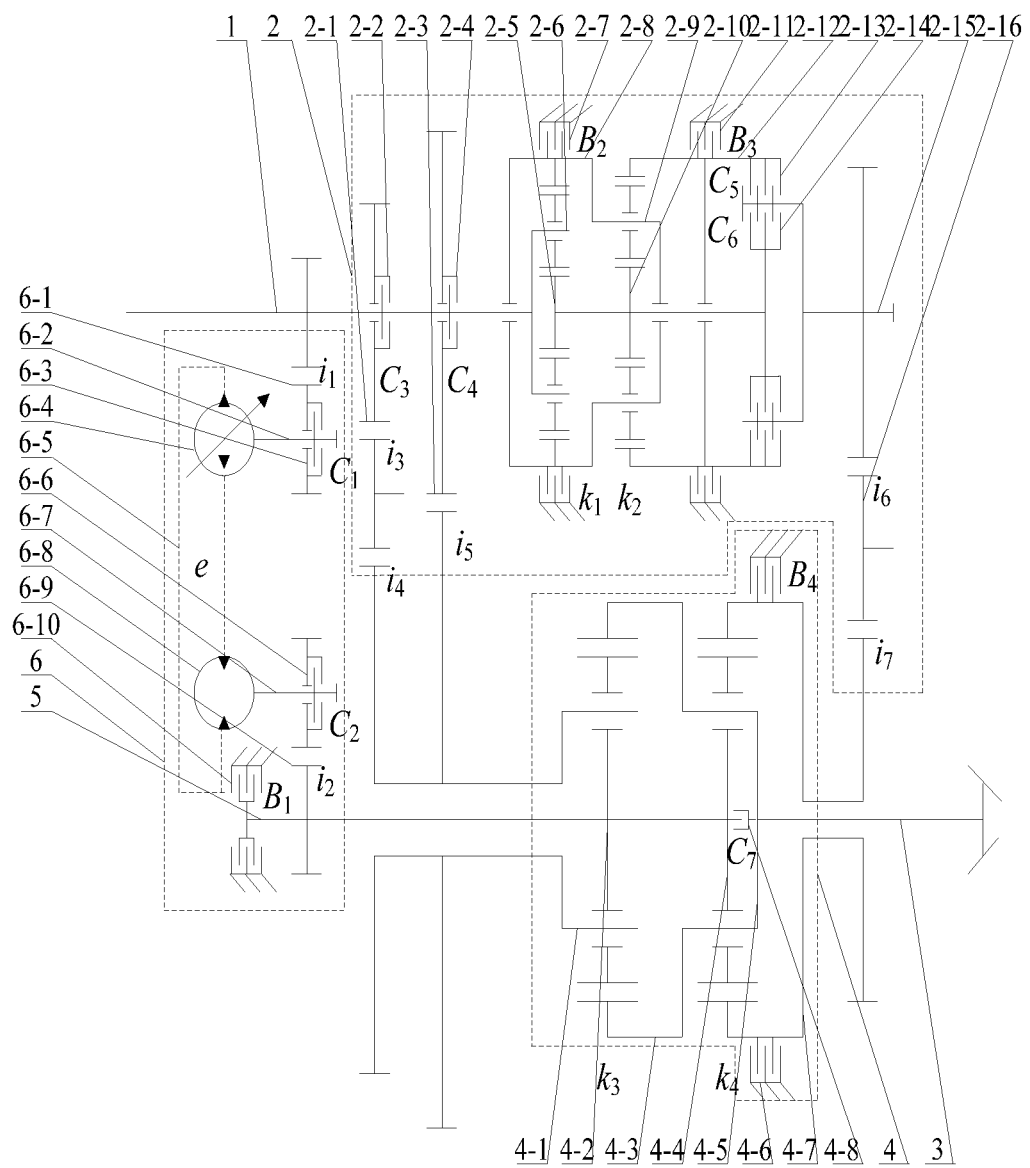
FIG. 1 is a schematic structural diagram of a multi-mode hydro-mechanical hybrid transmission device according to the present disclosure.

1. input shaft; 2. mechanical transmission mechanism; 2-1. left gear pair; 2-2. third clutch $C_3$; 2-3. right gear pair; 2-4. fourth clutch $C_4$; 2-5. left sun gear; 2-6. left planet carrier; 2-7. second brake $B_2$; 2-8. left ring gear; 2-9. right planet carrier; 2-10. right sun gear; 2-11. third brake $B_3$; 2-12. right ring gear; 2-13. fifth clutch $C_5$; 2-14. sixth clutch $C_6$; 2-15. mechanical transmission output shaft; 2-16. mechanical transmission output gear pair; 3. output shaft; 4. convergence mechanism; 4-1. convergence mechanism left planet carrier; 4-2. convergence mechanism left sun gear; 4-3. convergence mechanism left ring gear; 4-4. convergence mechanism right sun gear; 4-5. convergence mechanism right planet carrier; 4-6. fourth brake $B_4$; 4-7. convergence mechanism right ring gear; 4-8. seventh clutch $C_7$; 5. central shaft; 6. hydraulic transmission mechanism; 6-1. hydraulic transmission input gear pair; 6-2. hydraulic transmission input shaft; 6-3. first clutch $C_1$; 6-4. variable displacement pump; 6-5. hydraulic pipe; 6-6. second clutch $C_2$; 6-7. hydraulic transmission output shaft; 6-8. fixed displacement motor; 6-9. hydraulic transmission output gear pair; 6-10. first brake $B_1$.

DETAILED DESCRIPTION OF THE EMBODIMENTS

The present disclosure is further described below with reference to the accompanying drawings and specific embodiments, but the protection scope of the present disclosure is not limited thereto.

Embodiments of the present disclosure are described in detail below and are exemplified in the accompanying drawings, where the same or similar reference signs indicate the same or similar elements or elements with the same or similar functions. The embodiments described below with reference to the accompanying drawings are exemplary and are intended to explain the present disclosure, instead of limiting the present disclosure.

In the description of the present disclosure, it should be understood that terms such as "central", "longitudinal", "transverse", "length", "width", "thickness", "upper", "lower", "axial", "radial", "vertical", "horizontal", "inner", and "outer" indicate directional or positional relationships based on the accompanying drawings. They are merely used for the convenience and simplicity of the description of the present disclosure, instead of indicating or implying that the demonstrated device or element is located in a specific direction or is constructed and operated in a specific direction. Therefore, they cannot be construed as limitations to the present disclosure. Moreover, terms "first" and "second" are merely used for the purpose of description, and cannot be understood as indicating or implying relative importance or implicitly indicating the number of denoted technical features. Therefore, a feature defined by "first" or "second" explicitly or implicitly includes one or more such features. In the description of the present disclosure, "a plurality of" means two or above two, unless otherwise expressly defined.

In the present disclosure, unless otherwise expressly specified and defined, terms such as "mounted", "interconnected", "connected", and "fixed" should be understood in a broad sense. For example, they may be fixed connections, detachable connections, or integral connections; may be mechanical connections or electrical connections; may be direct connections or indirect connections through an intermediate medium; and may be internal communications between two elements. The specific meanings of the above terms in the present disclosure can be understood by persons of ordinary skill in the art according to specific situations.

As shown in FIG. 1, the multi-mode hydro-mechanical hybrid transmission device of the present disclosure includes an input shaft 1, a mechanical transmission mechanism 2, an output shaft 3, a convergence mechanism 4, a central shaft 5, a hydraulic transmission mechanism 6, a clutch assembly, and a brake assembly.

The hydraulic transmission mechanism 6 includes a hydraulic transmission input gear pair 6-1, a hydraulic transmission input shaft 6-2, a first clutch $C_1$ 6-3, a variable displacement pump 6-4, a hydraulic pipe 6-5, a second clutch $C_2$ 6-6, a hydraulic transmission output shaft 6-7, a fixed displacement motor 6-8, a hydraulic transmission output gear pair 6-9, and a first brake $B_1$ 6-10. The first clutch $C_1$ 6-3 is configured for connecting the input shaft 1 to the hydraulic transmission input shaft 6-2. The second clutch $C_2$ 6-6 is configured for connecting the hydraulic transmission output shaft 6-7 to the central shaft 5. The first brake $B_1$ 6-10 is configured for inhibiting motion of the central shaft 5.

The mechanical transmission mechanism 2 includes a left sun gear 2-5, a left planet carrier 2-6, a second brake $B_2$ 2-7, a left ring gear 2-8, a right planet carrier 2-9, a right sun gear 2-10, a third brake $B_3$ 2-11, a right ring gear 2-12, a fifth clutch $C_5$ 2-13, a sixth clutch $C_6$ 2-14, a mechanical transmission output shaft 2-15, and a mechanical transmission output gear pair 2-16. The left sun gear 2-5, the left planet carrier 2-6, and the left ring gear 2-8 form a left planetary gear train. The right planet carrier 2-9, the right sun gear 2-10, and the right ring gear 2-12 form a right planetary gear train. The left sun gear 2-5 is connected to the right sun gear 2-10. The right ring gear 2-12 is connected to the left planet carrier 2-6. The fifth clutch $C_5$ 2-13 is configured for connecting the right ring gear 2-12 to the mechanical transmission output shaft 2-15. The sixth clutch $C_6$ 2-14 is configured for connecting the right sun gear 2-10 to the mechanical transmission output shaft 2-15. The fifth clutch $C_5$ 2-13 and the sixth clutch $C_6$ 2-14 are both engaged to make the mechanical transmission mechanism 2 fixedly connected as a whole. The second brake $B_2$ 2-7 is configured for connecting the left ring gear 2-8 to a fixed member. The third brake $B_3$ 2-11 is configured for connecting the right ring gear 2-12 to a fixed member.

The convergence mechanism 4 includes a convergence mechanism left planetary gear train, a convergence mechanism right gear train, the first brake $B_1$ 6-10, a fourth brake $B_4$ 4-6, a third clutch $C_3$ 2-2, a fourth clutch $C_4$ 2-4, and a seventh clutch $C_7$ 4-8. The convergence mechanism left planetary gear train includes a convergence mechanism left planet carrier 4-1, a convergence mechanism left sun gear 4-2, and a convergence mechanism left ring gear 4-3. The convergence mechanism right gear train includes a convergence mechanism right sun gear 4-4, a convergence mechanism right planet carrier 4-5, and a convergence mechanism right ring gear 4-7. The convergence mechanism left sun gear 4-2 is connected to the convergence mechanism right sun gear 4-4, the convergence mechanism left sun gear 4-2 is connected to the central shaft 5, and the convergence mechanism left sun gear 4-2 is connected to an output end of the hydraulic transmission mechanism 6. The convergence mechanism left ring gear 4-3 is connected to the convergence mechanism right planet carrier 4-5. The input shaft 1 is connected to the convergence mechanism left planet carrier 4-1 through a left gear pair 2-1 and a right gear pair 2-3. The convergence mechanism right ring gear 4-7 is connected to the mechanical transmission output shaft 2-15 through the mechanical transmission output gear pair 2-16. The convergence mechanism right planet carrier 4-5 is connected to the output shaft 3. The third clutch $C_3$ 2-2 is configured for connecting the input shaft 1 to an input end of the convergence mechanism 4 through the left gear pair 2-1. The fourth clutch $C_4$ 2-4 is configured for connecting the input shaft 1 to the input end of the convergence mechanism 4 through the right gear pair 2-3. The seventh clutch $C_7$ 4-8 is configured for connecting the convergence mechanism right sun gear 4-4 to the convergence mechanism right planet carrier 4-5. The first brake $B_1$ 6-10 is configured for connecting the convergence mechanism left sun gear 4-2 to a fixed member. The fourth brake $B_4$ 4-6 is configured for connecting the convergence mechanism right ring gear 4-7 to a fixed member.

Shifting among 14 forward and reverse gears in mechanical transmission, hydraulic transmission, and hydro-mechanical hybrid transmission modes is implemented through combination and engagement/disengagement of the clutches and the brakes. The engagement state of the gear-shift components is shown in Table 1.

TABLE 1

Engagement state of gear-shift components

| Gear | Symbol | $C_1$ | $C_2$ | $C_3$ | $C_4$ | $C_5$ | $C_6$ | $C_7$ | $B_1$ | $B_2$ | $B_3$ | $B_4$ |
|---|---|---|---|---|---|---|---|---|---|---|---|---|
| Forward mechanical transmission gear M1 | F(M1) | | | | | ▲ | ▲ | | ▲ | | | |
| Forward mechanical transmission gear M2 | F(M2) | | | | | | ▲ | | ▲ | | ▲ | |
| Forward mechanical transmission gear M3 | F(M3) | | | | ▲ | | | | ▲ | | | |
| Forward mechanical transmission gear M4 | F(M4) | | | | | | ▲ | | ▲ | ▲ | | |
| Reverse mechanical transmission gear M1 | R(M1) | | | | | ▲ | | | ▲ | ▲ | | |
| Reverse mechanical transmission gear M2 | R(M2) | | | | ▲ | | | | ▲ | | | |
| Hydraulic transmission gear H1 | F(H1)/R(H1) | ▲ | ▲ | | | | | | | | | ▲ |
| Hydraulic transmission gear H2 | F(H2)/R(H2) | ▲ | ▲ | | | | ▲ | | | | | |
| Forward hydro-mechanical hybrid transmission gear HM1 | F(HM1) | ▲ | ▲ | | | ▲ | ▲ | | | | | |
| Forward hydro-mechanical hybrid transmission gear HM2 | F(HM2) | ▲ | ▲ | ▲ | | | | | | | | |
| Forward hydro-mechanical hybrid transmission gear HM3 | F(HM3) | ▲ | ▲ | | | ▲ | | | | ▲ | | |
| Forward hydro-mechanical hybrid transmission gear HM4 | F(HM4) | ▲ | ▲ | | | ▲ | | | ▲ | | | |
| Reverse hydro-mechanical hybrid transmission gear HM3 | R(HM1) | ▲ | ▲ | | | ▲ | | | ▲ | | | |
| Reverse hydro-mechanical hybrid transmission gear HM4 | R(HM2) | ▲ | ▲ | | ▲ | | | | | | | |

In Table 1: C stands for clutch and B stands for brake;
F stands for forward gear and R stands for reverse gear;
H stands for hydraulic transmission, M stands for mechanical transmission, and HM stands for hydro-mechanical transmission;
▲ indicates that the component is engaged.

Forward or reverse mechanical transmissions of various transmission ratios are provided between the input member and the output member by engaging the third clutch $C_3$ 2-2, the fourth clutch $C_4$ 2-4, the fifth clutch $C_5$ 2-13, the sixth clutch $C_6$ 2-14, the first brake $B_1$ 6-10, the second brake $B_2$ 2-7, and the third brake $B_3$ 2-11.

Figure 2:
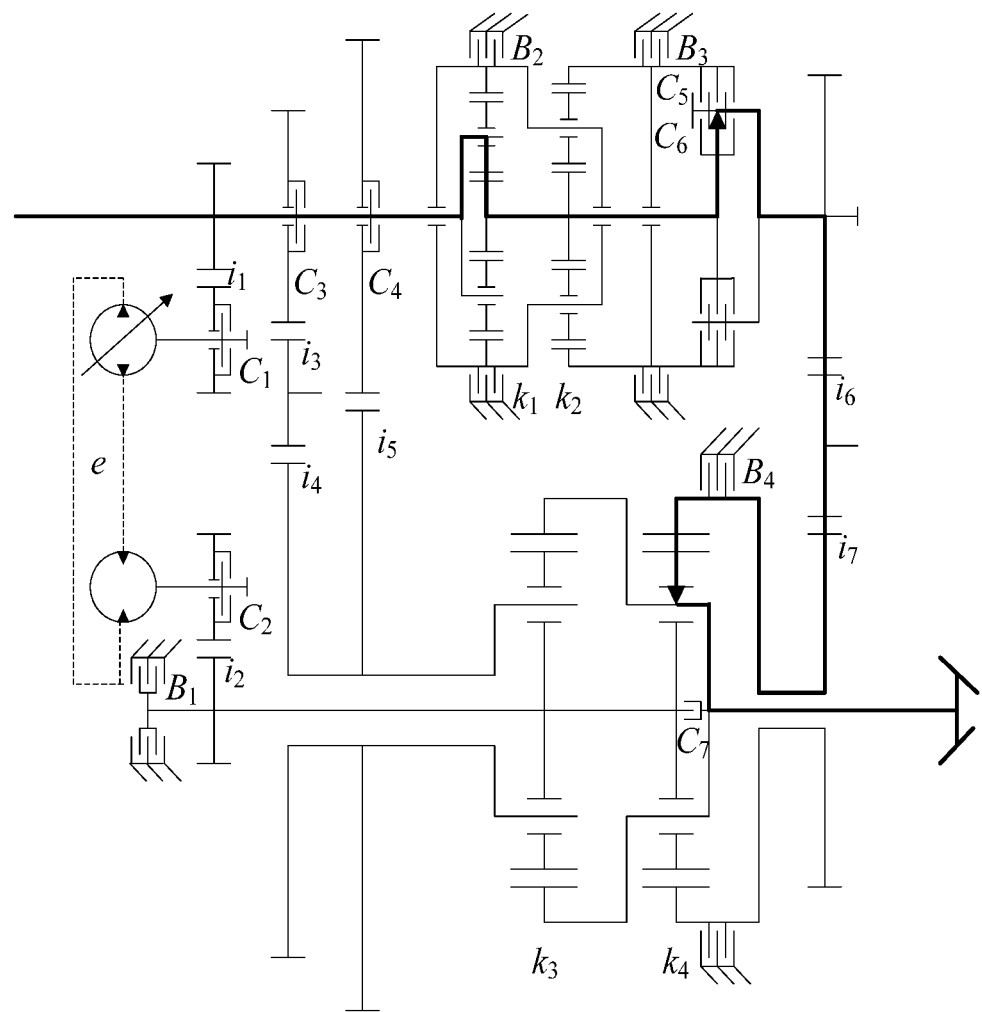
FIG. 2 is a schematic diagram showing the power flow in a mechanical transmission gear F(M1) according to the present disclosure.

The power flow in the mechanical transmission F(M1) is shown in FIG. 2, where only the fifth clutch $C_5$ 2-13, the sixth clutch $C_6$ 2-14, and the first brake $B_1$ 6-10 are engaged. Power is transmitted through the input shaft 1 and the mechanical transmission mechanism 2 that is fixedly connected as a whole to the mechanical transmission output shaft 2-15, and then transmitted through the mechanical transmission output gear pair 2-16 to the convergence mechanism right ring gear 4-7. After that, the power passes through the convergence mechanism right planet carrier 4-5 and is output from the output shaft 3. The relationship between the output speed and the input speed is:

$$n_o = \frac{k_4}{(k_4 + 1)i_6 i_7} n_I$$

where $n_o$ is a rotation speed of the output member and $n_I$ is a rotation speed of the input member; $k_4$ is a characteristic parameter of the convergence mechanism right gear train; $i_6 i_7$ is a transmission ratio between the mechanical transmission output shaft 2-15 and the convergence mechanism right ring gear 4-7.

Figure 3:
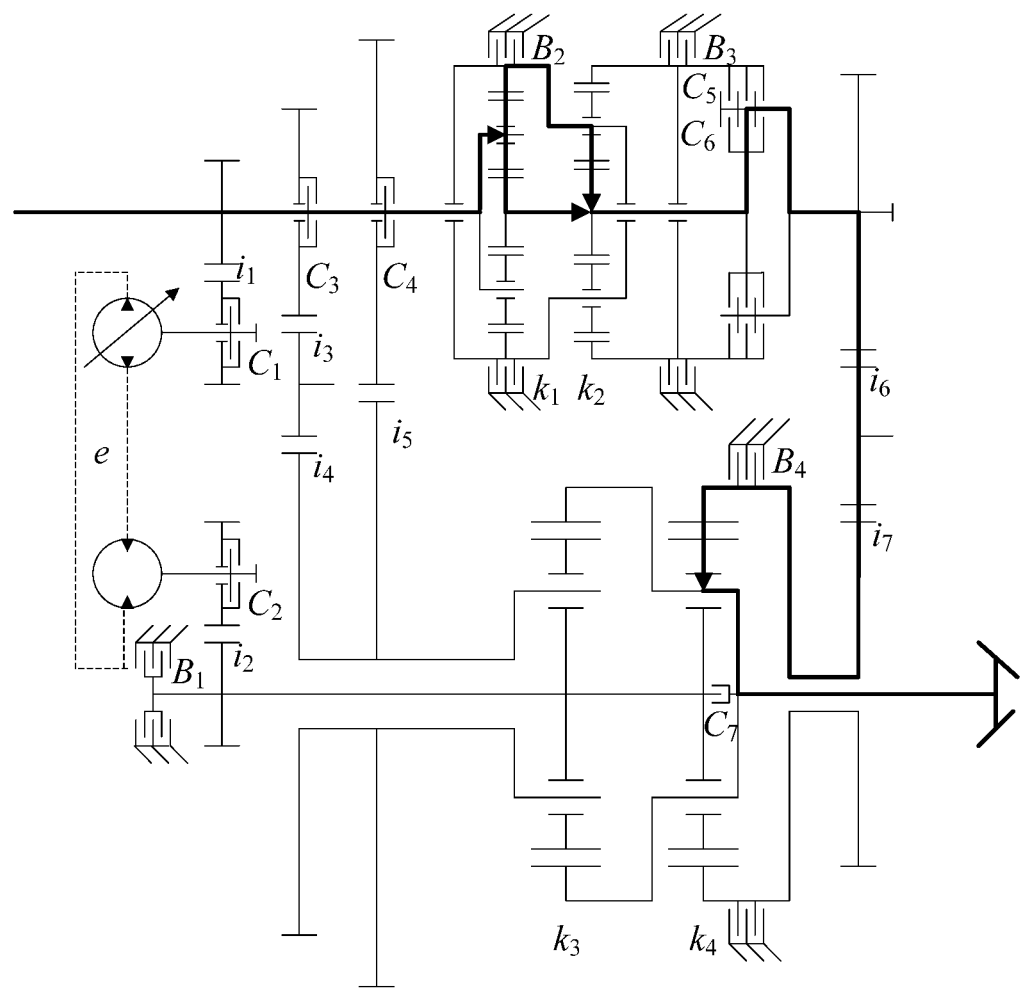
FIG. 3 is a schematic diagram showing the power flow in a mechanical transmission gear F(M2) according to the present disclosure.

The power flow in the mechanical transmission F(M2) is shown in FIG. 3, where only the sixth clutch $C_6$ 2-14, the first brake $B_1$ 6-10, and the third brake $B_3$ 2-11 are engaged. Power is transmitted through the input shaft 1 and the left planet carrier 2-6 and is split into the right planet carrier 2-9 and the right sun gear 2-10. The power is converged through the right sun gear 2-10 into the mechanical transmission output shaft 2-15, and then transmitted through the mechanical transmission output gear pair 2-16 to the convergence mechanism right ring gear 4-7. After that, the power passes through the convergence mechanism right planet carrier 4-5 and is output from the output shaft 3. The relationship between the output speed and the input speed is:

$$n_o = \frac{(k_1 + 1)(k_2 + 1)k_4}{(k_1 + k_2 + 1)(k_4 + 1)i_6 i_7} n_I$$

where $k_1$ is a characteristic parameter of the left planetary gear train and $k_2$ is a characteristic parameter of the right planetary gear train.

Figure 4:
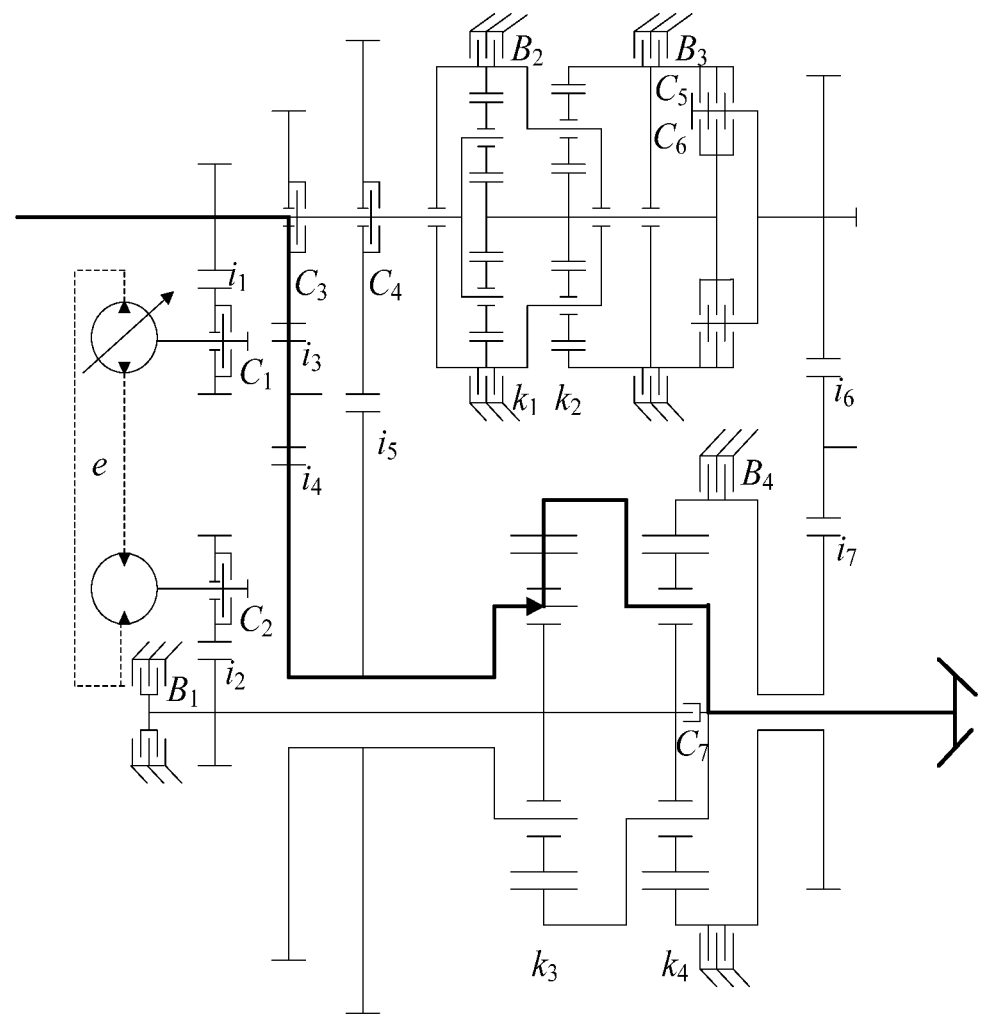
FIG. 4 is a schematic diagram showing the power flow in a mechanical transmission gear F(M3) according to the present disclosure.

The power flow in the mechanical transmission F(M3) is shown in FIG. 4, where only the third clutch $C_3$ 2-2 and the seventh clutch $C_7$ 4-8 are engaged. Power is transmitted through the input shaft 1 and the left gear pair 2-1 to the convergence mechanism left planet carrier 4-1, then passes through the convergence mechanism 4 that is fixedly connected as a whole, and is output from the output shaft 3. The relationship between the output speed and the input speed is:

$$n_o = \frac{1}{i_3 i_4} n_I$$

where $i_3 i_4$ is a transmission ratio of the left gear pair 2-1.

Figure 5:
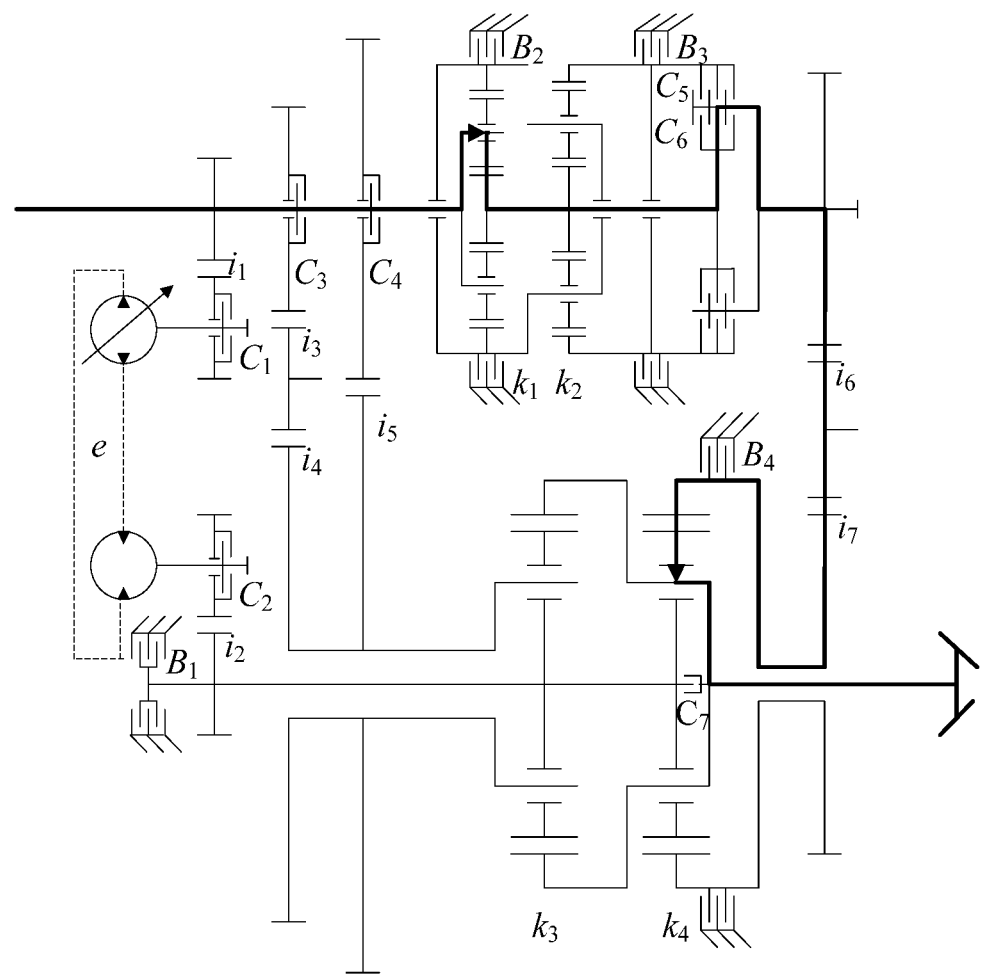
FIG. 5 is a schematic diagram showing the power flow in a mechanical transmission gear F(M4) according to the present disclosure.

The power flow in the mechanical transmission F(M4) is shown in FIG. 5, where only the sixth clutch $C_6$ 2-14, the first brake $B_1$ 6-10, and the second brake $B_2$ 2-7 are engaged. Power is transmitted through the input shaft 1, the left planet carrier 2-6, the left sun gear 2-5, and the right sun gear 2-10 to the mechanical transmission output shaft 2-15, and then transmitted through the mechanical transmission output gear pair 2-16 to the convergence mechanism right ring gear 4-7. After that, the power passes through the convergence mechanism right planet carrier 4-5 and is output from the output shaft 3. The relationship between the output speed and the input speed is:

$$n_o = \frac{(k_1 + 1)k_4}{(k_4 + 1)i_6 i_7} n_I$$

Figure 6:
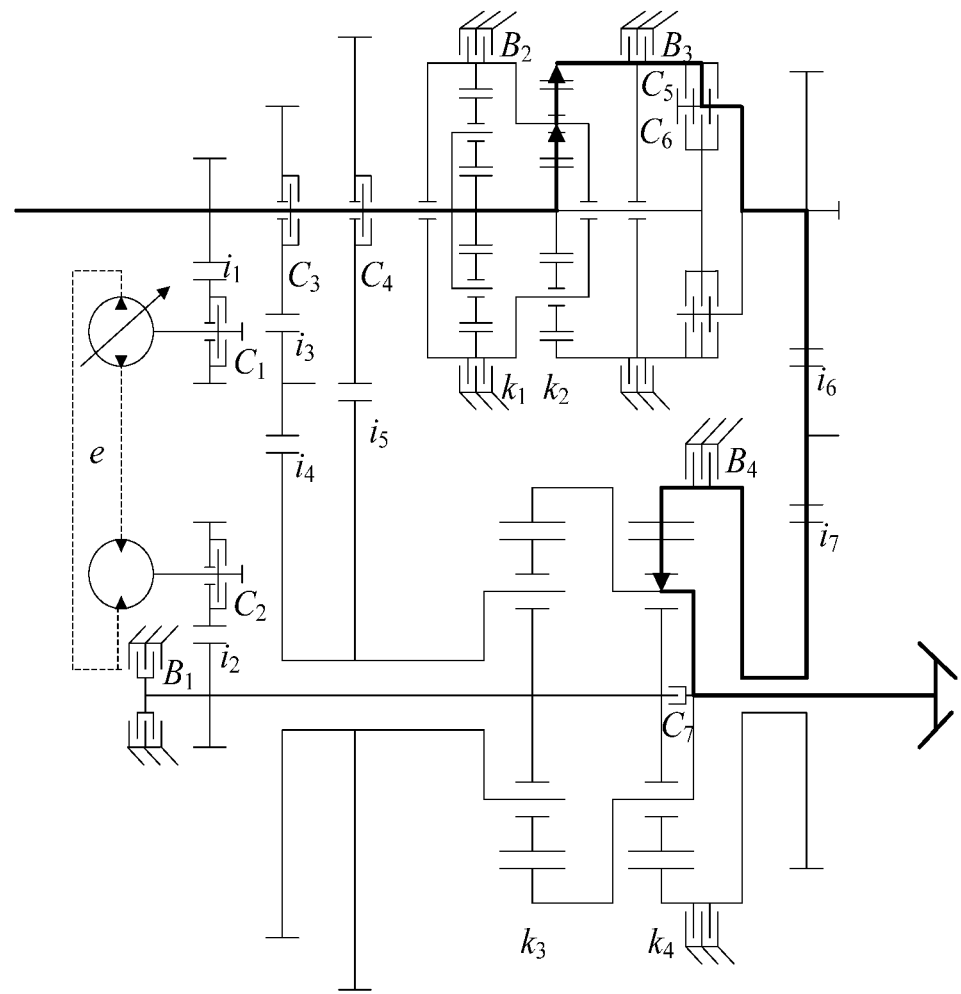
FIG. 6 is a schematic diagram showing the power flow in a mechanical transmission gear R(M1) according to the present disclosure.

The power flow in the mechanical transmission R(M1) is shown in FIG. 6, where only the fifth clutch $C_5$ 2-13, the first brake $B_1$ 6-10, and the second brake $B_2$ 2-7 are engaged. Power is transmitted through the input shaft 1, the left planet carrier 2-6, the left sun gear 2-5, the right sun gear 2-10, and the right ring gear 2-12 to the mechanical transmission output shaft 2-15, and then transmitted through the mechanical transmission output gear pair 2-16 to the convergence mechanism right ring gear 4-7. After that, the power passes through the convergence mechanism right planet carrier 4-5 and is output from the output shaft 3. The relationship between the output speed and the input speed is:

$$n_o = -\frac{k_1 + 1}{k_2(k_4 + 1)i_6 i_7} n_I$$

Figure 7:
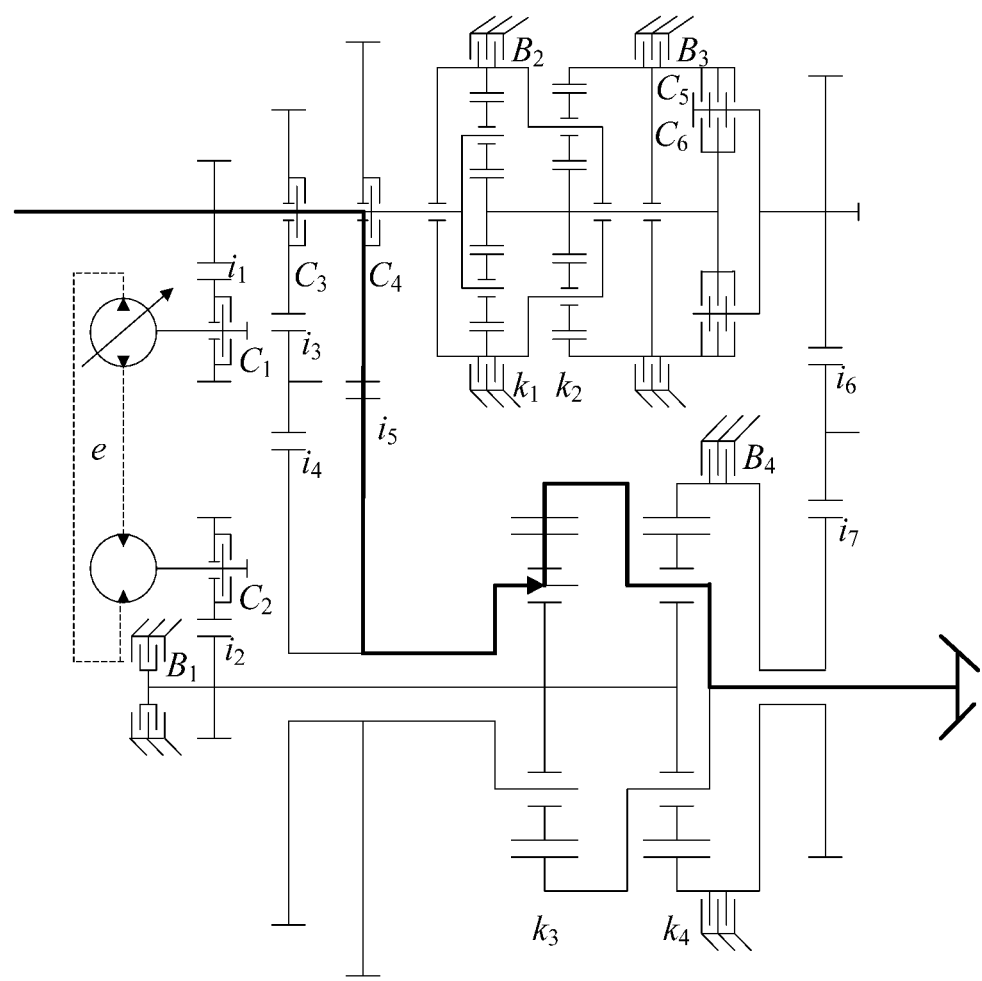
FIG. 7 is a schematic diagram showing the power flow in a mechanical transmission gear R(M2) according to the present disclosure.

The power flow in the mechanical transmission R(M2) is shown in FIG. 7, where only the fourth clutch $C_4$ 2-4 and the first brake $B_1$ 6-10 are engaged. Power is transmitted through the input shaft 1 and the right gear pair 2-3 to the convergence mechanism left planet carrier 4-1, then transmitted through the convergence mechanism left ring gear 4-3 and the convergence mechanism right planet carrier 4-5, and is output from the output shaft 3. The relationship between the output speed and the input speed is:

$$n_o = -\frac{k_3 + 1}{k_3 i_5} n_I$$

where $k_3$ is a characteristic parameter of the convergence mechanism left gear train and $i_5$ is a transmission ratio of the right gear pair 2-3.

Forward or reverse hydraulic transmissions of various transmission ratios are provided between the input member and the output member by adjusting a displacement ratio of the hydraulic transmission mechanism 6 and engaging the first clutch $C_1$ 6-3, the second clutch $C_2$ 6-6, the seventh clutch $C_7$ 4-8, and the fourth brake $B_4$ 4-6.

Figure 8:
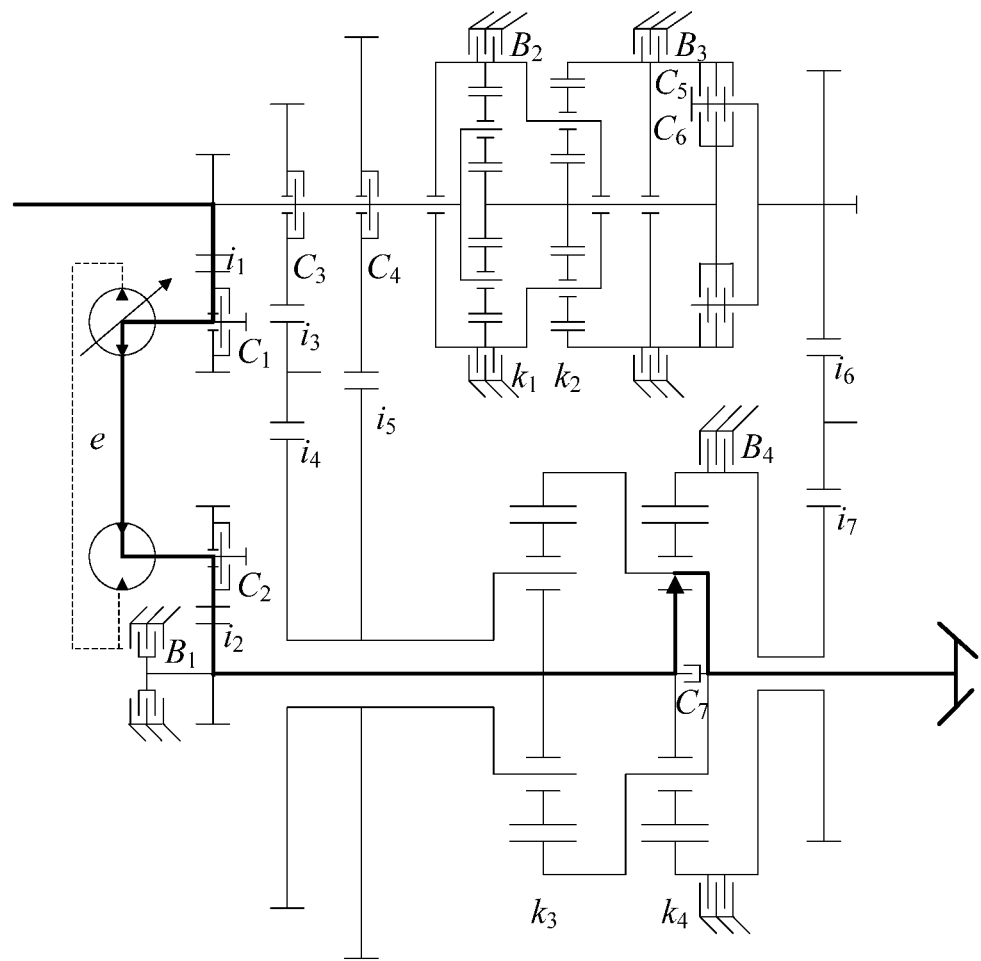
FIG. 8 is a schematic diagram showing the power flow in a hydraulic transmission gear F(H1)/R(H1) according to the present disclosure.

The power flow in the hydraulic transmission F(H1)/R (H1) is shown in FIG. 8, where only the first clutch $C_1$ 6-3, the second clutch $C_2$ 6-6, and the fourth brake $B_4$ 4-6 are engaged. Power is transmitted through the input shaft 1 and the hydraulic transmission input gear pair 6-1 to the hydraulic transmission input shaft 6-2 to drive the variable displacement pump 6-4. Oil flows through the hydraulic pipe 6-5 to drive the fixed displacement motor 6-8, thereby enabling the hydraulic transmission output shaft 6-7 to work. After that, the power passes through the hydraulic transmission output gear pair 6-9, the convergence mechanism right sun gear 4-4, and the convergence mechanism right planet carrier 4-5 and is output from the output shaft 3. The relationship between the output speed and the input speed is:

$$n_o = \frac{e}{(k_4 + 1)i_1 i_2} n_I$$

where $k_4$ is the characteristic parameter of the convergence mechanism right gear train; e is the displacement ratio of the hydraulic transmission mechanism 6; $i_1$ is a transmission ratio between an input end of the hydraulic transmission mechanism 6 and the input member, and $i_2$ is a transmission ratio between the output end of the hydraulic transmission mechanism 6 and the convergence mechanism left sun gear 4-2; when e>0, the gear F(H1) is implemented and when e<0, the gear R(H1) is implemented.

Figure 9:
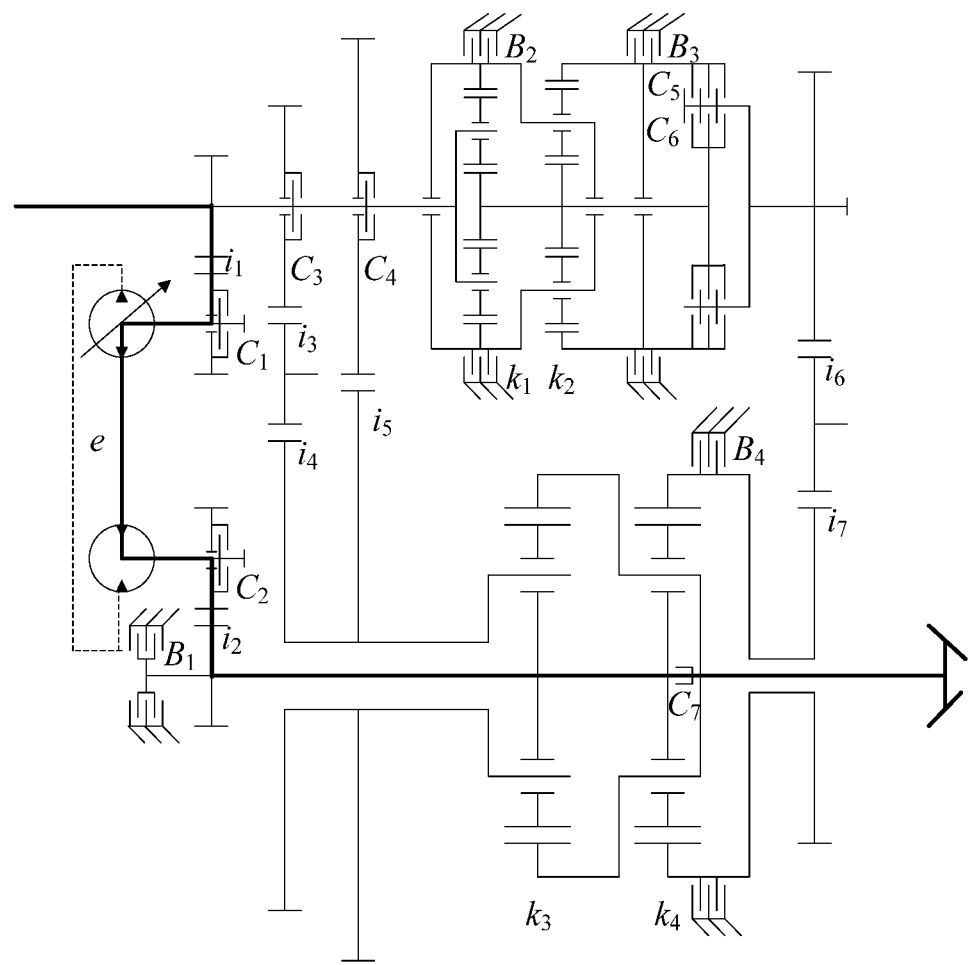
FIG. 9 is a schematic diagram showing the power flow in a hydraulic transmission gear F(H2)/R(H2) according to the present disclosure.

The power flow in the hydraulic transmission F(H2)/R (H2) is shown in FIG. 9, where only the first clutch $C_1$ 6-3, the second clutch $C_2$ 6-6, and the seventh clutch $C_7$ 4-8 are engaged. Power is transmitted through the input shaft 1 and the hydraulic transmission input gear pair 6-1 to the hydraulic transmission input shaft 6-2 to drive the variable displacement pump 6-4. Oil flows through the hydraulic pipe 6-5 to drive the fixed displacement motor 6-8, thereby enabling the hydraulic transmission output shaft 6-7 to work. After that, the power passes through the hydraulic transmission output gear pair 6-9 and the convergence mechanism 4 that is fixedly connected as a whole and is output from the output shaft 3. The relationship between the output speed and the input speed is:

$$n_o = \frac{e}{i_1 i_2} n_I$$

where when e>0, F(H2) is implemented and when e<0, R(H2) is implemented.

Forward or reverse hydro-mechanical hybrid transmissions of various transmission ratios are provided between the input member and the output member by adjusting the displacement ratio of the hydraulic transmission mechanism 6 and engaging the first clutch $C_1$ 6-3, the second clutch $C_2$ 6-6, the third clutch $C_3$ 2-2, the fourth clutch $C_4$ 2-4, the fifth clutch $C_5$ 2-13, the sixth clutch $C_6$ 2-14, the second brake $B_2$ 2-7, and the third brake $B_3$ 2-11.

Figure 10:
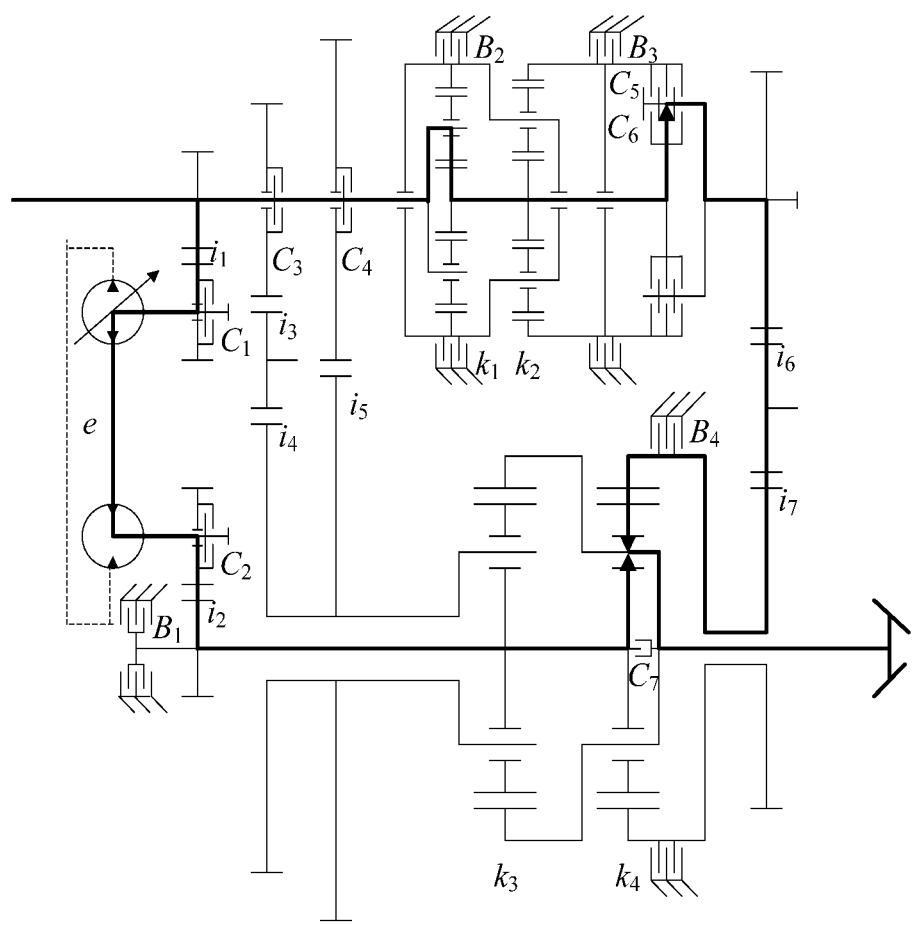
FIG. 10 is a schematic diagram showing the power flow in a hydro-mechanical hybrid transmission gear F(HM1) according to the present disclosure.

The power flow in the hydro-mechanical hybrid transmission F(HM1) is shown in FIG. 10, where only the first clutch $C_1$ 6-3, the second clutch $C_2$ 6-6, the fifth clutch $C_5$ 2-13, and the sixth clutch $C_6$ 2-14 are engaged. Power is transmitted through the input shaft 1 and is split into two parts. One part of the power is transmitted through the mechanical transmission mechanism 2 that is fixedly connected as a whole to the mechanical transmission output shaft 2-15, and then transmitted through the mechanical transmission output gear pair 2-16 to the convergence mechanism right ring gear 4-7. The other part of the power is transmitted through the hydraulic transmission mechanism 6 to the convergence mechanism right sun gear 4-4. The mechanical power transmitted to the convergence mechanism right ring gear 4-7 and the hydraulic power transmitted to the convergence mechanism right sun gear 4-4 are converged at the convergence mechanism right planet carrier 4-5 and then output from the output shaft 3. The relationship between the output speed and the input speed is:

$$n_o = \frac{\frac{e}{i_1 i_2} + \frac{k_4}{i_6 i_7}}{k_4 + 1} n_I$$

Figure 11:
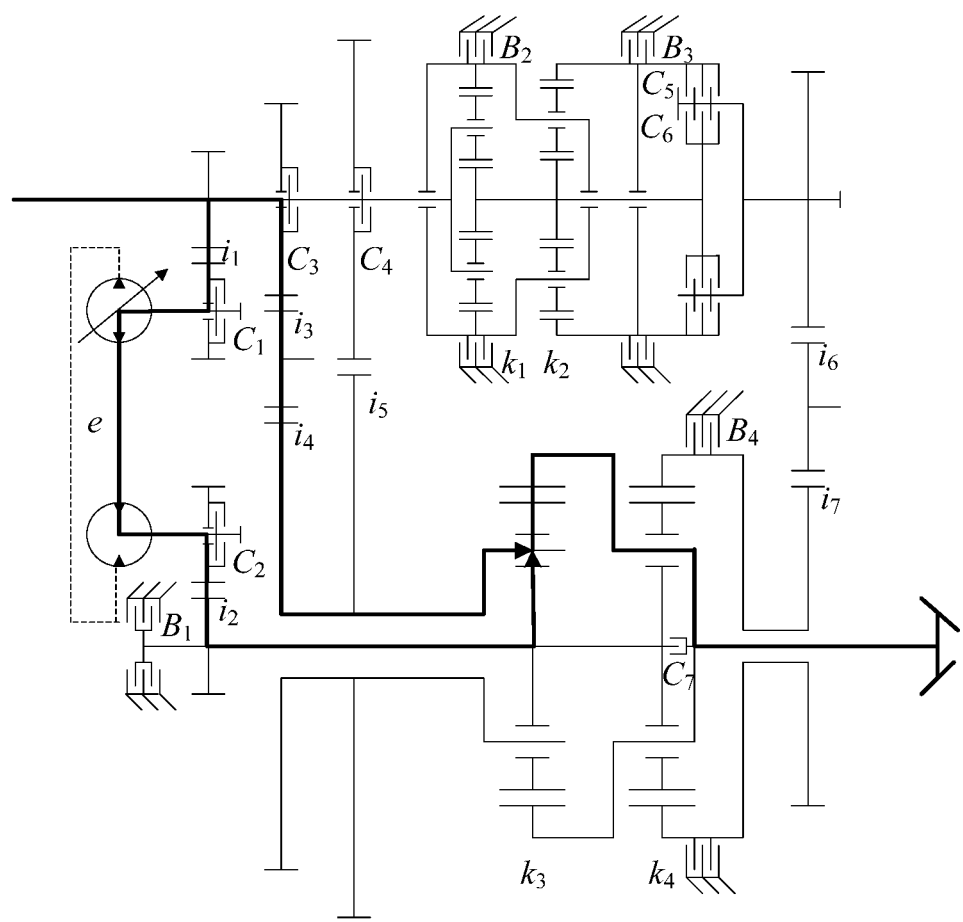
FIG. 11 is a schematic diagram showing the power flow in a hydro-mechanical hybrid transmission gear F(HM2) according to the present disclosure.

The power flow in the hydro-mechanical hybrid transmission F(HM2) is shown in FIG. 11, where only the first clutch $C_1$ 6-3, the second clutch $C_2$ 6-6, and the third clutch $C_3$ 2-2 are engaged. Power is transmitted through the input shaft 1 and is split into two parts. One part of the power is transmitted through the left gear pair 2-1 to the convergence mechanism left planet carrier 4-1. The other part of the power is transmitted through the hydraulic transmission mechanism 6 to the convergence mechanism left sun gear 4-2. The mechanical power transmitted to the planet carrier 4-1 and the hydraulic power transmitted to the left sun gear 4-2 are converged at the convergence mechanism left ring gear 4-3. The power after convergence passes through the convergence mechanism right planet carrier 4-5 and is output from the output shaft 3. The relationship between the output speed and the input speed is:

$$n_o = \frac{\frac{k_3 + 1}{i_3 i_4} - \frac{e}{i_1 i_2}}{k_3} n_I$$

Figure 12:
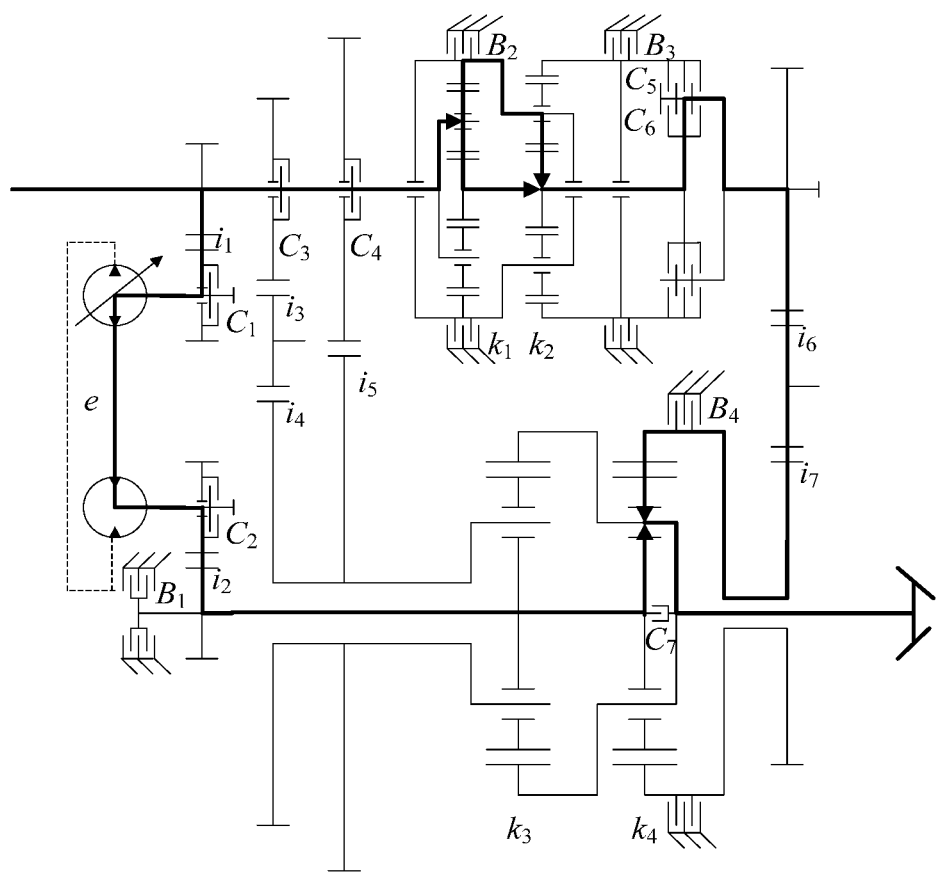
FIG. 12 is a schematic diagram showing the power flow in a hydro-mechanical hybrid transmission gear F(HM3) according to the present disclosure.

The power flow in the hydro-mechanical hybrid transmission F(HM3) is shown in FIG. 12, where only the first clutch $C_1$ 6-3, the second clutch $C_2$ 6-6, the sixth clutch $C_6$ 2-14, and the third brake $B_3$ 2-11 are engaged. Power is transmitted through the input shaft 1 and is split into two parts. One part of the power is transmitted through the left planet carrier 2-6 and is split into the right planet carrier 2-9 and the right sun gear 2-10. The power is converged through the right sun gear 2-10 into the mechanical transmission output shaft 2-15, and then transmitted through the mechanical transmission output gear pair 2-16 to the convergence mechanism right ring gear 4-7. The other part of the power is transmitted through the hydraulic transmission mechanism 6 to the convergence mechanism right sun gear 4-4. The mechanical power transmitted to the convergence mechanism right ring gear 4-7 and the hydraulic power transmitted to the convergence mechanism right sun gear 4-4 are converged at the convergence mechanism right planet carrier 4-5 and then output from the output shaft 3. The relationship between the output speed and the input speed is:

$$n_o = \frac{\frac{(k_1 + 1)(k_2 + 1)k_4}{(k_1 + k_2 + 1)i_6 i_7} + \frac{e}{i_1 i_2}}{k_4 + 1} n_I$$

Figure 13:
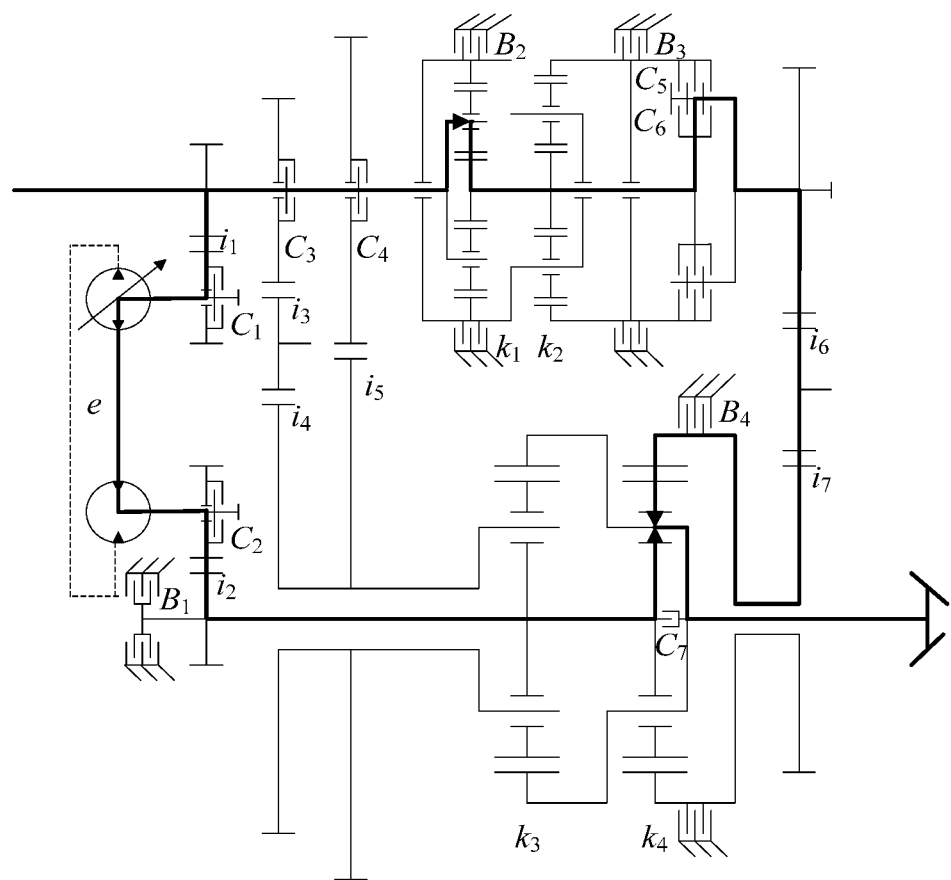
FIG. 13 is a schematic diagram showing the power flow in a hydro-mechanical hybrid transmission gear F(HM4) according to the present disclosure.

The power flow in the hydro-mechanical hybrid transmission gear F(HM4) is shown in FIG. 13, where only the first clutch $C_1$ 6-3, the second clutch $C_2$ 6-6, the sixth clutch $C_6$ 2-14, and the second brake $B_2$ 2-7 are engaged. Power is transmitted through the input shaft 1 and is split into two parts. One part of the power is transmitted through the left planet carrier 2-6, the left sun gear 2-5, and the right sun gear 2-10 to the mechanical transmission output shaft 2-15, and then transmitted through the mechanical transmission output gear pair 2-16 to the convergence mechanism right ring gear 4-7. The other part of the power is transmitted through the hydraulic transmission mechanism 6 to the convergence mechanism right sun gear 4-4. The mechanical power transmitted to the convergence mechanism right ring gear 4-7 and the hydraulic power transmitted to the convergence mechanism right sun gear 4-4 are converged at the convergence mechanism right planet carrier 4-5 and then output from the output shaft 3. The relationship between the output speed and the input speed is:

$$n_o = \frac{\frac{(k_1+1)k_4}{i_6 i_7} + \frac{e}{i_1 i_2}}{(k_4+1)} n_I$$

Figure 14:
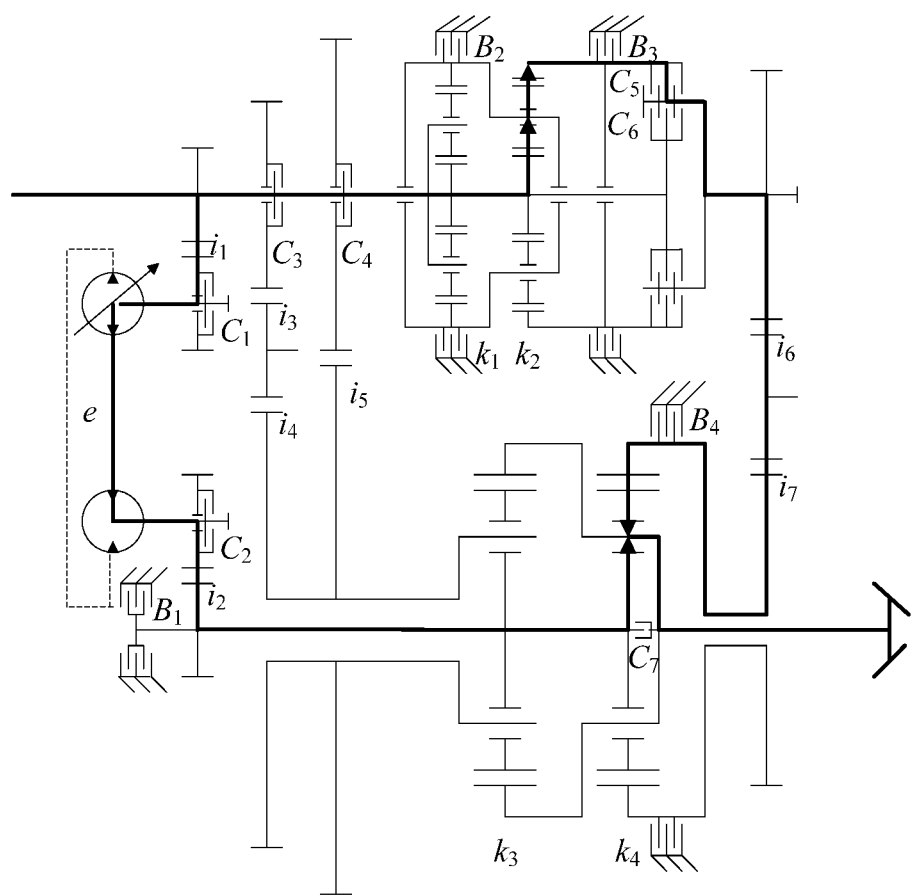
FIG. 14 is a schematic diagram showing the power flow in a hydro-mechanical hybrid transmission gear R(HM1) according to the present disclosure.

The power flow in the hydro-mechanical hybrid transmission R(HM1) is shown in FIG. 14, where only the first clutch $C_1$ 6-3, the second clutch $C_2$ 6-6, the fifth clutch $C_5$ 2-13, and the second brake $B_2$ 2-7 are engaged. Power is transmitted through the input shaft 1 and is split into two parts. One part of the power is transmitted through the left planet carrier 2-6, the left sun gear 2-5, the right sun gear 2-10, and the right ring gear 2-12 to the mechanical transmission output shaft 2-15, and then transmitted through the mechanical transmission output gear pair 2-16 to the convergence mechanism right ring gear 4-7. The other part of the power is transmitted through the hydraulic transmission mechanism 6 to the convergence mechanism right sun gear 4-4. The mechanical power transmitted to the convergence mechanism right ring gear 4-7 and the hydraulic power transmitted to the convergence mechanism right sun gear 4-4 are converged at the convergence mechanism right planet carrier 4-5 and then output from the output shaft 3. The relationship between the output speed and the input speed is:

$$n_o = \frac{-\frac{(k_1+1)k_4}{k_2 i_6 i_7} + \frac{e}{i_1 i_2}}{k_4+1} n_I$$

Figure 15:
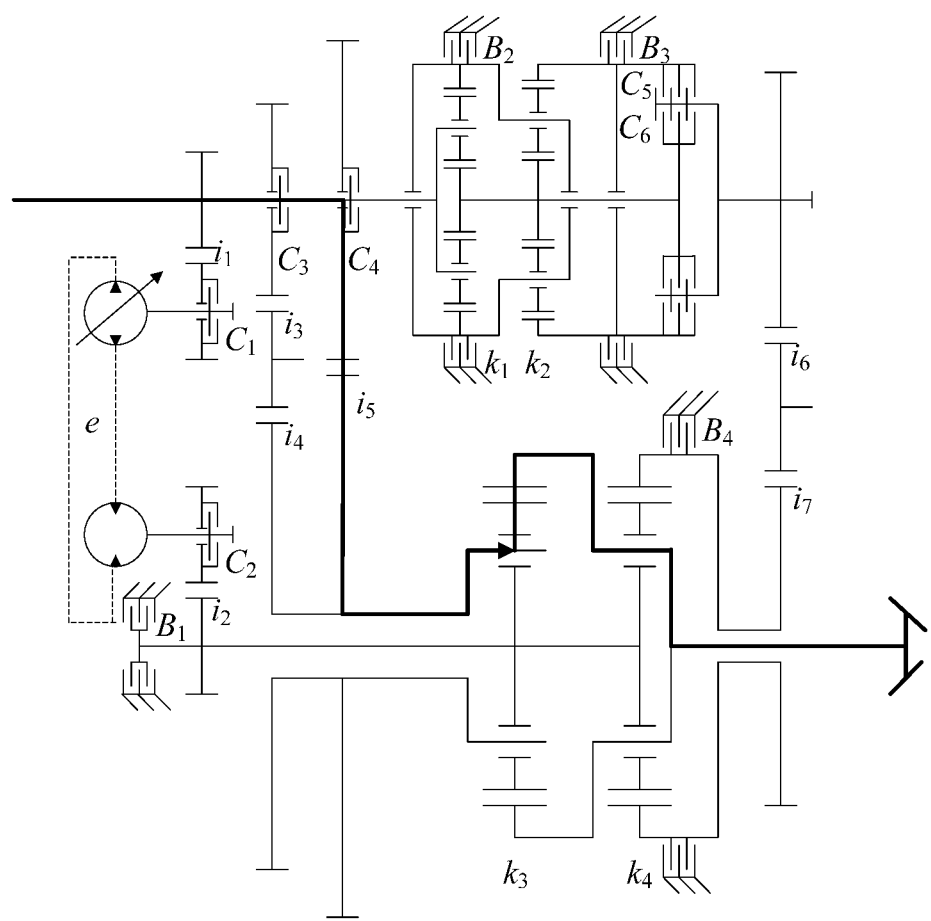
FIG. 15 is a schematic diagram showing the power flow in a hydro-mechanical hybrid transmission gear R(HM2) according to the present disclosure.

The power flow in the hydro-mechanical hybrid transmission R(HM2) is shown in FIG. 15, where only the first clutch $C_1$ 6-3, the second clutch $C_2$ 6-6, and the fourth clutch $C_4$ 2-4 are engaged. Power is transmitted through the input shaft 1 and is split into two parts. One part of the power is transmitted through the right gear pair 2-3 to the convergence mechanism left planet carrier 4-1. The other part of the power is transmitted through the hydraulic transmission mechanism 6 to the convergence mechanism left sun gear 4-2. The mechanical power transmitted to the planet carrier 4-1 and the hydraulic power transmitted to the left sun gear 4-2 are converged at the convergence mechanism left ring gear 4-3. The power after convergence passes through the convergence mechanism right planet carrier 4-5 and is output from the output shaft 3. The relationship between the output speed and the input speed is:

$$n_o = \frac{-\frac{k_3+1}{i_5} - \frac{e}{i_1 i_2}}{k_3} n_I$$

Embodiment

The main parameters are set as follows: $i_1 i_2 = 1.00$, $i_3 i_4 = i_5 = i_6 i_7 = 1.00$, $k_1 = k_2 = k_4 = 2$, and $k_3 = 3$.

Figure 16:
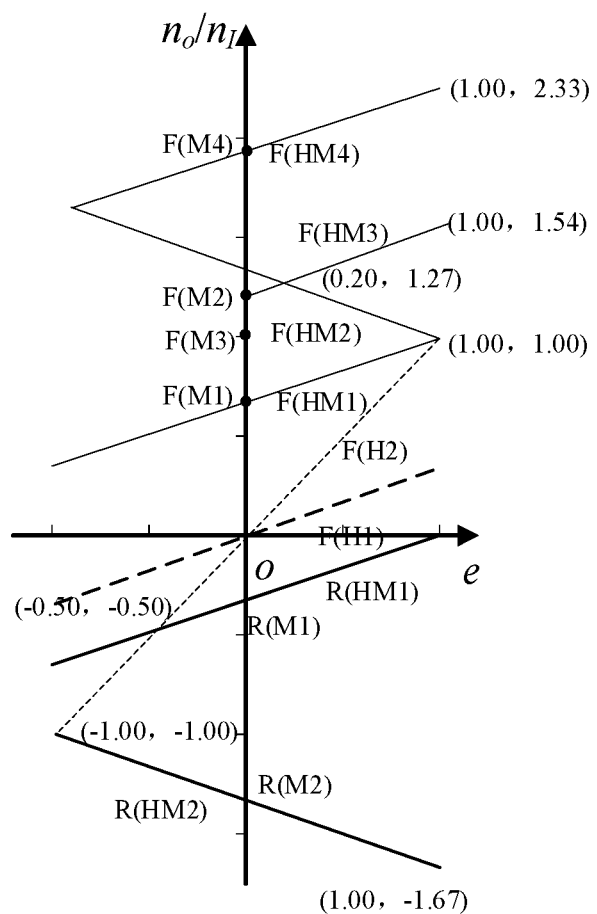
FIG. 16 shows characteristic curves of gear shifts and speed regulation according to the present disclosure.

FIG. 16 shows relationships between the output-input speed ratios and the displacement ratios of the transmission device, where the output shaft can be connected to a speed reducer to drive a vehicle to move.

O is the origin;

(0, 0.67) is a feature point in the mechanical transmission gear F(M1), that is, $n_o = 0.67 n_I$;

(0, 1.20) is a feature point in the mechanical transmission gear F(M2), that is, $n_o = 1.20 n_I$;

(0, 1.33) is a feature point in the mechanical transmission gear F(M3), that is, $n_o = n_I$;

(0, 2.00) is a feature point in the mechanical transmission gear F(M4), that is, $n_o = 2.00 n_I$;

(0, −0.33) is a feature point in the mechanical transmission gear R(M1), that is, $n_o = -0.5 n_I$;

(0, −1.00) is a feature point in the mechanical transmission gear R(M2), that is, $n_o = -1.33 n_I$;

in the gear H1, $$n_o = \frac{e}{3} n_I,$$

and when $e \in [-1.00, 1.00]$, $n_o/n_e \in [-0.33, 0.33]$;

in the gear H2, $n_o = e n_I$, and when $e \in [-1.00, 1.00]$, $n_o/n_e \in [-1.00, 1.00]$;

in the gear F(HM1), $$n_o = \frac{2+e}{3} n_I,$$

and when $e \in [-1.00, 1.00]$, $n_o/n_e \in [0.33, 1.00]$;

in the gear F(HM2), $$n_o = \frac{4-e}{3} n_I,$$

and when $e \in [-1.00, 1.00]$, $n_o/n_e \in [1.00, 1.67]$;

in the gear F(HM3), $$n_o = \frac{3.6+e}{3} n_I,$$

and when $e \in [-1.00, 1.00]$, $n_o/n_e \in [0.87, 1.54]$;

in the gear F(HM4), $$n_o = \frac{6+e}{3} n_I,$$

and when $e \in [-1.00, 1.00]$, $n_o/n_e \in [1.67, 2.33]$;

in the gear R(HM1), $$n_o = \frac{e-3}{3} n_I,$$

and when $e \in [-1.00, 1.00]$, $n_o/n_e \in [-1.33, -0.67]$;

in the gear R(HM2), $$n_o = \frac{-4-e}{3} n_I,$$

and when $e \in [-1.00, 1.00]$, $n_o/n_e \in [-1.67, -1.00]$;

when e=1.00, gear shift without power interruption is carried out between F(H2) and F(HM1) at a feature point (1.00, 1.00);

when e=1.00, gear shift without power interruption is carried out between F(HM1) and F(HM2) at the feature point (1.00, 1.00);

when e=0.20, gear shift without power interruption is carried out between F(HM2) and F(HM3) at a feature point (0.20, 1.27);

when e=−1.00, gear shift without power interruption is carried out between F(HM2) and F(HM4) at a feature point (−1.00, 1.67);

when e=−1.00, gear shift without power interruption is carried out between F(H2) and R(HM2) at a feature point (−1.00, −1.00);

when e=−0.50, gear shift without power interruption is carried out between R(HM1) and R(HM2) at a feature point (−0.50, −1.17).

When the requirement on the precision of the hydraulic transmissions is high, the gear H2 is replaced by the gear H1, but the gear H2 cannot be shifted without power interruption to the hydro-mechanical hybrid transmission gears.

It should be understood that although this specification is described in accordance with the embodiments, each embodiment does not merely include one independent technical solution. This narrative way of the specification is only for clarity, and persons skilled in the art should regard the specification as a whole. The technical solutions in the embodiments can also be appropriately combined to form other implementations that can be understood by persons skilled in the art.

The above descriptions are merely practical embodiments of the present disclosure, and are not intended to limit the protection scope of the present disclosure. Any equivalent embodiments or modifications made without departing from the spirit of the present disclosure shall fall within the protection scope of the present disclosure.

What is claimed is:

1. A multi-mode hydro-mechanical hybrid transmission device, comprising an input member, a hydraulic transmission mechanism, a mechanical transmission mechanism, a convergence mechanism, an output member, a clutch assembly, and a brake assembly, wherein the clutch assembly connects an output end of the input member to an input end of the hydraulic transmission mechanism, the mechanical transmission mechanism, and the convergence mechanism, the clutch assembly connects an output end of the hydraulic transmission mechanism to the convergence mechanism, and the clutch assembly connects the mechanical transmission mechanism to the convergence mechanism;

the convergence mechanism is connected to the output member; continuously changing transmission ratios are provided between the input member and the output member by adjusting a displacement ratio of the hydraulic transmission mechanism and selectively controlling an engagement of the clutch assembly and the brake assembly;

the mechanical transmission mechanism comprises a mechanical transmission output shaft, a left planetary gear train, and a right planetary gear train;

the left planetary gear train comprises a left sun gear, a left planet carrier, and a left ring gear; the right planetary gear train comprises a right planet carrier, a right sun gear, and a right ring gear, wherein the left sun gear is connected to the right sun gear and the right ring gear is connected to the left planet carrier;

the clutch assembly comprises a fifth clutch and a sixth clutch, wherein the fifth clutch is configured for connecting the right ring gear to the mechanical transmission output shaft and the sixth clutch is configured for connecting the right sun gear to the mechanical transmission output shaft;

the brake assembly comprises a second brake and a third brake, wherein the second brake is configured for connecting the left ring gear to a fixed member and the third brake is configured for connecting the right ring gear to a fixed member;

the convergence mechanism comprises a convergence mechanism left planetary gear train and a convergence mechanism right gear train, wherein the convergence mechanism left planetary gear train comprises a convergence mechanism left planet carrier, and a convergence mechanism left sun gear, and a convergence mechanism left ring gear;

the convergence mechanism right gear train comprises a convergence mechanism right sun gear, a convergence mechanism right planet carrier, and a convergence mechanism right ring gear;

the convergence mechanism left sun gear is connected to the convergence mechanism right sun gear, and the convergence mechanism left sun gear is connected to the output end of the hydraulic transmission mechanism;

the convergence mechanism left ring gear is connected to the convergence mechanism right planet carrier;

the input member is connected to the convergence mechanism left planet carrier through a left gear pair and a right gear pair;

the convergence mechanism right ring gear is connected to the mechanical transmission output shaft through a mechanical transmission output gear pair, and the convergence mechanism right planet carrier is connected to the output member;

the clutch assembly further comprises a third clutch, a fourth clutch, and a seventh clutch, wherein the third clutch is configured for connecting the input member to an input end of the convergence mechanism through the left gear pair, the fourth clutch is configured for connecting the input member to the input end of the convergence mechanism through the right gear pair, and the seventh clutch is configured for connecting the convergence mechanism right sun gear to the convergence mechanism right planet carrier;

the brake assembly further comprises a first brake and a fourth brake, wherein the first brake is configured for connecting the convergence mechanism left sun gear to a fixed member and the fourth brake is configured for connecting the convergence mechanism right ring gear to a fixed member.

2. The multi-mode hydro-mechanical hybrid transmission device according to claim 1, comprising forward or reverse transmission modes comprising a hydraulic transmission, a mechanical transmission, and a hydro-mechanical hybrid transmission are provided between the input member and the output member by adjusting the displacement ratio of the hydraulic transmission mechanism and selectively controlling the engagement of the clutch assembly and the brake assembly.

3. The multi-mode hydro-mechanical hybrid transmission device according to claim 2, wherein forward or reverse mechanical transmissions of various transmission ratios are provided between the input member and the output member by engaging the third clutch, the fourth clutch, the fifth clutch, the sixth clutch, the first brake, the second brake, and the third brake.

4. The multi-mode hydro-mechanical hybrid transmission device according to claim 3, wherein a forward mechanical transmission F(M1) is provided between the input member and the output member by engaging the fifth clutch, the sixth clutch, and the first brake, and rotation speeds of the input member and the output member in the mechanical transmission F(M1) satisfy the following relationship:

$$n_o = \frac{k_4}{(k_4 + 1)i_6 i_7} n_I;$$

wherein $n_o$ is the rotation speed of the output member and $n_I$ is the rotation speed of the input member; $k_4$ is a characteristic parameter of the convergence mechanism right gear train; $i_6 i_7$ is a transmission ratio between the mechanical transmission output shaft and the convergence mechanism right ring gear;

a forward mechanical transmission F(M2) is provided between the input member and the output member by engaging the sixth clutch, the first brake, and the third brake, and the rotation speeds of the input member and the output member in the mechanical transmission F(M2) satisfy the following relationship:

$$n_o = \frac{(k_1 + 1)(k_2 + 1)k_4}{(k_1 + k_2 + 1)(k_4 + 1)i_6 i_7} n_I$$

wherein $k_1$ is a characteristic parameter of the left planetary gear train and $k_2$ is a characteristic parameter of the right planetary gear train;

a forward mechanical transmission F(M3) is provided between the input member and the output member by engaging the third clutch and the seventh clutch, and the rotation speeds of the input member and the output member in the mechanical transmission F(M3) satisfy the following relationship:

$$n_o = \frac{1}{i_3 i_4} n_I$$

wherein $i_3 i_4$ is a transmission ratio of the left gear pair;

a forward mechanical transmission F(M4) is provided between the input member and the output member by engaging the sixth clutch, the first brake, and the second brake, and the rotation speeds of the input member and the output member in the mechanical transmission F(M4) satisfy the following relationship:

$$n_o = \frac{(k_1 + 1)k_4}{(k_4 + 1)i_6 i_7} n_I;$$

a reverse mechanical transmission R(M1) is provided between the input member and the output member by engaging the fifth clutch, the first brake, and the second brake, and the rotation speeds of the input member and the output member in the mechanical transmission R(M1) satisfy the following relationship:

$$n_o = -\frac{(k_1 + 1)}{k_2(k_4 + 1)i_6 i_7} n_I;$$

a reverse mechanical transmission R(M2) is provided between the input member and the output member by engaging the fourth clutch and the first brake, and the rotation speeds of the input member and the output member in the mechanical transmission R(M2) satisfy the following relationship:

$$n_o = -\frac{k_3 + 1}{k_3 i_5} n_I$$

wherein $k_3$ is a characteristic parameter of a convergence mechanism left gear train and $i_5$ is a transmission ratio of the right gear pair.

5. The multi-mode hydro-mechanical hybrid transmission device according to claim 2, wherein the clutch assembly further comprises a first clutch and a second clutch,
wherein the first clutch is configured for connecting the input member to the input end of the hydraulic transmission mechanism, and the second clutch is configured for connecting the output end of the hydraulic transmission mechanism to the convergence mechanism left sun gear;
forward or reverse hydraulic transmissions of various transmission ratios are provided between the input member and the output member by adjusting the displacement ratio of the hydraulic transmission mechanism and engaging the first clutch, the second clutch, the seventh clutch, and the fourth brake.

6. The multi-mode hydro-mechanical hybrid transmission device according to claim 5, wherein a forward or reverse hydraulic transmission F(H1)/R(H1) is provided between the input member and the output member by adjusting the displacement ratio of the hydraulic transmission mechanism and engaging the first clutch, the second clutch, and the fourth brake, and the rotation speeds of the input member and the output member in the hydraulic transmission F(H1)/R(H1) satisfy the following relationship:

$$n_o = \frac{e}{(k_4 + 1)i_1 i_2} n_I$$

wherein $k_4$ is a characteristic parameter of the convergence mechanism right gear train;
e is the displacement ratio of the hydraulic transmission mechanism;
$i_1$ is a transmission ratio between the input end of the hydraulic transmission mechanism and the input member, and $i_2$ is a transmission ratio between the output end of the hydraulic transmission mechanism and the convergence mechanism left sun gear;
when e>0, F(H1) is implemented and when e<0, R(H1) is implemented;

a forward or reverse hydraulic transmission F(H2)/R(H2) is provided between the input member and the output member by engaging the first clutch-, the second clutch, and the seventh clutch, and the rotation speeds of the input member and the output member in the hydraulic transmission F(H2)/R(H2) satisfy the following relationship:

$$n_o = \frac{e}{i_1 i_2} n_I$$

wherein when e>0, F(H2) is implemented and when e<0, R(H2) is implemented.

7. The multi-mode hydro-mechanical hybrid transmission device according to claim 5, wherein forward or reverse hydro-mechanical hybrid transmissions of various transmission ratios are provided between the input member and the output member by adjusting the displacement ratio of the hydraulic transmission mechanism and engaging the first clutch, the second clutch, the third clutch, the fourth clutch, the fifth clutch, the sixth clutch, the second brake, and the third brake.

8. The multi-mode hydro-mechanical hybrid transmission device according to claim 7, wherein a forward hydro-mechanical hybrid transmission F(HM1) is provided between the input member and the output member by adjusting the displacement ratio of the hydraulic transmission mechanism and engaging the first clutch, the second clutch, the fifth clutch, and the sixth clutch, and the rotation speeds of the input member and the output member in the hydro-mechanical hybrid transmission F(HM1) satisfy the following relationship:

$$n_o = \frac{\frac{e}{i_1 i_2} + \frac{k_4}{i_6 i_7}}{k_4 + 1} n_I;$$

a forward hydro-mechanical hybrid transmission F(HM2) is provided between the input member and the output member by adjusting the displacement ratio of the hydraulic transmission mechanism and engaging the first clutch, the second clutch, and the third clutch, and the rotation speeds of the input member and the output member in the hydro-mechanical hybrid transmission F(HM2) satisfy the following relationship:

$$n_o = \frac{\frac{k_3 + 1}{i_3 i_4} - \frac{e}{i_1 i_2}}{k_3} n_I;$$

a forward hydro-mechanical hybrid transmission F(HM3) is provided between the input member and the output member by adjusting the displacement ratio of the hydraulic transmission mechanism and engaging the first clutch, the second clutch, the sixth clutch, and the third brake, and the rotation speeds of the input member and the output member in the hydro-mechanical hybrid transmission F(HM3) satisfy the following relationship:

$$n_o = \frac{\frac{(k_1+1)(k_2+1)k_4}{(k_1+k_2+1)i_6 i_7} + \frac{e}{i_1 i_2}}{k_4 + 1} n_I;$$

a forward hydro-mechanical hybrid transmission F(HM4) is provided between the input member and the output member by adjusting the displacement ratio of the hydraulic transmission mechanism and engaging the first clutch the second clutch, the sixth clutch, and the second brake, and the rotation speeds of the input member and the output member in the hydro-mechanical hybrid transmission F(HM4) satisfy the following relationship:

$$n_o = \frac{\frac{(k_1+1)k_4}{i_6 i_7} + \frac{e}{i_1 i_2}}{(k_4 + 1)} n_I;$$

a reverse hydro-mechanical hybrid transmission R(HM1) is provided between the input member and the output member by adjusting the displacement ratio of the hydraulic transmission mechanism and engaging the first clutch, the second clutch, the fifth clutch, and the second brake, and the rotation speeds of the input member and the output member in the hydro-mechanical hybrid transmission R(HM1) satisfy the following relationship:

$$n_o = \frac{-\frac{(k_1+1)k_4}{k_2 i_6 i_7} + \frac{e}{i_1 i_2}}{k_4 + 1} n_I;$$

a reverse hydro-mechanical hybrid transmission R(HM2) is provided between the input member and the output member by adjusting the displacement ratio of the hydraulic transmission mechanism and engaging the first clutch, the second clutch, and the fourth clutch, and the rotation speeds of the input member and the output member in the hydro-mechanical hybrid transmission R(HM2) satisfy the following relationship:

$$n_o = \frac{\frac{k_3+1}{i_5} - \frac{e}{i_1 i_2}}{k_3} n_I.$$

* * * * *